United States Patent
Sun et al.

(10) Patent No.: US 11,683,697 B2
(45) Date of Patent: *Jun. 20, 2023

(54) CONFIGURED GRANT TRANSMISSION IN NEW RADIO-UNLICENSED (NR-U)

(71) Applicant: QUALCOMM Incorporated, San Diego, CA (US)

(72) Inventors: Jing Sun, San Diego, CA (US); Ananta Narayanan Thyagarajan, Bangalore (IN); Kapil Bhattad, Bangalore (IN); Xiaoxia Zhang, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,960

(22) Filed: Jul. 26, 2022

(65) Prior Publication Data

US 2022/0369117 A1 Nov. 17, 2022

Related U.S. Application Data

(63) Continuation of application No. 17/070,840, filed on Oct. 14, 2020, now Pat. No. 11,438,772.

(30) Foreign Application Priority Data

Oct. 18, 2019 (IN) .............................. 201941042352

(51) Int. Cl.
*H04W 16/14* (2009.01)
*H04W 72/0446* (2023.01)
(Continued)

(52) U.S. Cl.
CPC ....... *H04W 16/14* (2013.01); *H04W 72/0446* (2013.01); *H04W 72/23* (2023.01); *H04W 74/006* (2013.01); *H04W 76/27* (2018.02)

(58) Field of Classification Search
CPC ..... H04W 16/14; H04W 76/27; H04W 72/23; H04W 72/0446; H04W 74/006
(Continued)

(56) References Cited

U.S. PATENT DOCUMENTS

2017/0231011 A1  8/2017 Park et al.
2019/0149269 A1  5/2019 Chatterjee et al.
(Continued)

FOREIGN PATENT DOCUMENTS

WO  2018097680 A1  5/2018
WO  2019160741 A1  8/2019

OTHER PUBLICATIONS

R1-1910043, "DL channels and signals in NR unlicensed band", 3GPP TSG RAN WG1 Meeting #98bis, Chongqing, China, Oct. 14-20, 2019, Huawei, HiSilicon (Year: 2019).*
(Continued)

*Primary Examiner* — Intekhaab A Siddiquee
(74) *Attorney, Agent, or Firm* — Haynes and Boone LLP

(57) ABSTRACT

Wireless communications systems and methods related to configured transmissions in a shared radio frequency band are provided. A user equipment (UE) receives, from a base station (BS), an indication of a first configured resource in a shared radio frequency band for a communication in a first direction. The UE receives, from the BS, a first configuration to select between a validation of the first direction or an absence of an invalidation of the first direction for using the first configured resource for the communication. The UE
(Continued)

communicates, with the BS, the communication in the first direction using the first configured resource based on the first configuration.

27 Claims, 16 Drawing Sheets

(51) Int. Cl.
*H04W 72/23* (2023.01)
*H04W 74/00* (2009.01)
*H04W 76/27* (2018.01)

(58) Field of Classification Search
USPC .......................................................... 370/329
See application file for complete search history.

(56) References Cited

U.S. PATENT DOCUMENTS

| | | |
|---|---|---|
| 2019/0342911 A1 | 11/2019 | Talarico et al. |
| 2020/0037354 A1 | 1/2020 | Li et al. |
| 2020/0137834 A1 | 4/2020 | Xiong et al. |
| 2021/0120431 A1 | 4/2021 | Sun et al. |

OTHER PUBLICATIONS

Huawei, et al., "DL Channels and Signals in NR Unlicensed Band", 3GPP Draft, 3GPP TSG RAN WG1 Meeting #98bis, R1-1910043, 3rd Generation Partnership Project (3GPP), Mobile Competence Centre, 650, Route Des Lucioles, F-06921, Sophia-Antipolis, Cedex, France, vol. RAN WG1, No. Chongqing, China, Oct. 14, 2019-Oct. 20, 2019, Oct. 8, 2019 (Oct. 8, 2019), XP051809057, 17 pages, Retrieved from the Internet: URL:https://ftp.3gpp.org/tsg_ran/WG1_RL1/TSGR1_98b/Docs/R1-1910043.zip R1-1910043.docx.

International Preliminary Report on Patentability—PCT/US2020/055856, The International Bureau of WIPO—Geneva, Switzerland, dated Apr. 28, 2022.

International Search Report and Written Opinion—PCT/US2020/055856—ISA/EPO—dated Dec. 21, 2020.

Panasonic: "COT Structure Indication", 3GPP Draft, 3GPP TSG-RAN WG1 Ad-Hoc Meeting 1901, R1-1900258, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593172, 3 pages, Retrieved from the Internet: URL:http://www.3gpp.org/ftp/Meetings%5F3GPP%5FSYNC/RAN1/Docs/R1%2D1900258%2Ezip.

* cited by examiner

CONFIGURED GRANT TRANSMISSION IN NEW RADIO-UNLICENSED (NR-U)

CROSS REFERENCE TO RELATED APPLICATIONS

The present application is a continuation of U.S. patent application Ser. No. 17/070,840, filed Oct. 14, 2020, which claims priority to and the benefit of Indian Provisional Patent Application No. 201941042352, filed Oct. 18, 2019, each of which is hereby incorporated by reference in its entirety as if fully set forth below and for all applicable purposes.

TECHNICAL FIELD

This application relates to wireless communication systems, and more particularly to configured grant transmission in a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a reservation signal (e.g., a preamble) to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes receiving, by a user equipment (UE) from a base station (BS), an indication of a first configured resource in a shared radio frequency band for a communication in a first direction; receiving, by the UE from the BS, a first configuration to select between a validation of the first direction or an absence of an invalidation of the first direction for using the first configured resource for the communication; and communicating, by the UE with the BS, the communication in the first direction using the first configured resource based on the first configuration In an additional aspect of the disclosure, a method of wireless communication, includes transmitting, by a base station (BS) to a user equipment (UE), an indication of a first configured resource in a shared radio frequency band for a communication in a first direction; transmitting, by the BS to the UE, a first configuration to select between a validation of the first direction or an absence of an invalidation of the first direction for using the first configured resource for the communication; and communicating, by the BS with the UE, the communication in the first direction using the first configured resource based on the first configuration.

In an additional aspect of the disclosure, a user equipment (UE) includes a transceiver configured to receive, from a base station (BS), an indication of a first configured resource in a shared radio frequency band for a communication in a first direction; receive, from the BS, a first configuration to select between a validation of the first direction or an absence of an invalidation of the first direction for using the first configured resource for the communication; and communicate, with the BS, the communication in the first direction using the first configured resource based on the first configuration.

In an additional aspect of the disclosure, a base station (BS) includes a transceiver configured to transmit, to a user equipment (UE), an indication of a first configured resource in a shared radio frequency band for a communication in a first direction; transmit, to the UE, a first configuration to select between a validation of the first direction or an absence of an invalidation of the first direction for using the first configured resource for the communication; and communicate, with the UE, the communication in the first direction using the first configured resource based on the first configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
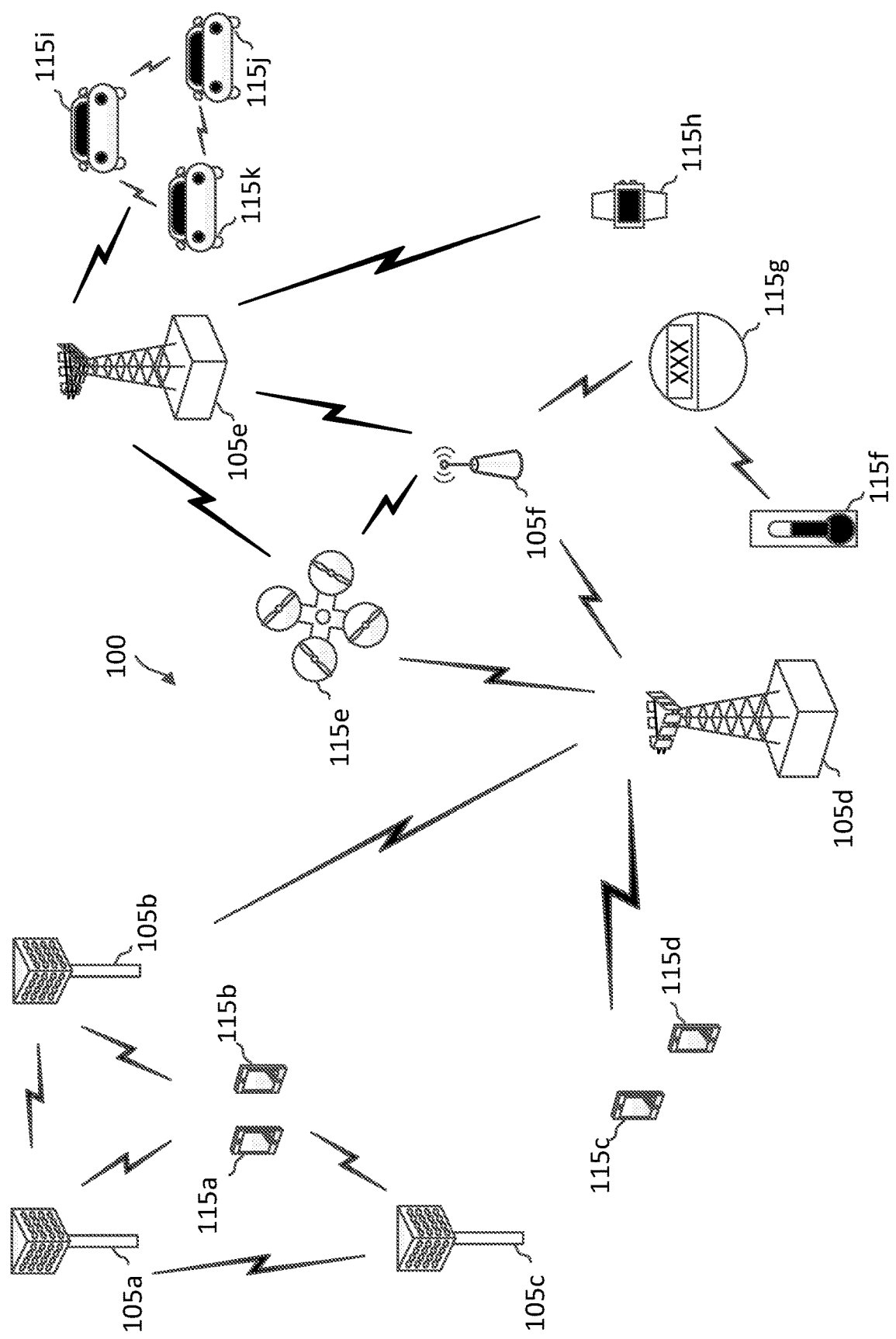
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless network, a base station (BS) may provide communicate with use equipment devices (UEs) using a certain radio frame structure partitioned into subframes and/or slots. A slot may be partitioned into symbols. The BS may use slot format indicators (SFIs) to indicate a transmission direction for each symbol in a slot. An SFI can indicate a UL direction, a DL direction, or a flexible direction for each symbol. A symbol indicated with a UL direction may be used for UL transmission. A symbol indicated with a DL direction may be used for DL transmission. A symbol indicated with a flexible direction may be used for UL or DL transmission. In some instances, an SFI can indicate transmission directions for symbols in a next few slots. In some instances, the BS may indicate an SFI via dynamic downlink control information (DCI) signaling. In some other instances, the BS may indicate an SFI via semi-static radio resource control (RRC) signaling, for example. The present disclosure may use the term "SFI" to refer to indications of slot format that are cell-specific, UE-specific, dynamically configured, semi-statically configured, sent via radio resource control (RRC), medium access control (MAC), physical layer signaling, or a combination thereof. In the context of an NR network, an SFI can be carried by a dynamic group common physical downlink control channel (GC-PDCCH) DCI format 2.0 for all UEs in a cell, an RRC semi-static TDD UL-DL configuration common for all UEs in a cell, an RRC semi-static TDD UL-DL configuration dedicated that UE-specific, or a combination thereof.

Additionally, the BS may configure a UE with configured grant resources for UL and/or DL communications. The configured grant configuration may be an RRC configuration. In some other implementations, configured grants can be signaled via MAC and/or physical layer signaling. A configured grant transmission using a configured resource refers to a transmission without a dynamic schedule. Thus, a configured grant transmission can also be referred to as an unscheduled transmission, an autonomous transmission, and/or a grant-free transmission. In some wireless networks, a configured transmission in a configured resource is allowed if an SFI indicates the same transmission direction for the configured resource. For instance, a UL configured transmission is allowed if an SFI indicates that symbols in the corresponding configured resource is assigned for a UL transmission. A UL configured transmission may be cancelled if an SFI indicates that symbols in the corresponding configured resource is assigned for a DL or flexible transmission. Similarly, a DL configured transmission is allowed if an SFI indicates that symbols in the corresponding configured resource is assigned for a DL transmission. A DL configured transmission may be cancelled if an SFI indicates that symbols in the corresponding configured resource is assigned for a UL or flexible transmission.

When operating NR over an unlicensed band, a BS may provide SFI information symbols within the duration of a BS's COT, but not outside the BS's COT. However, a configured grant resource may or may not be within the BS's COT. When a configured grant resource is outside of the BS's COT, a UE may not receive SFI information for validating the transmission directions of the symbols in the configured resource. Thus, instead of performing a category 4 (CAT4) listen-before-talk (LBT) and proceeding with transmitting in the configured resource, the lack of SFI for configured resources outside of the BS's COT can cause the UE to refrain from transmitting in the configured resource, causing the medium to be underutilized.

The present application describes mechanisms for configured grant transmissions in a shared radio frequency band. For example, a BS may configure a UE with configured resources for UL and/or DL configured transmissions. The BS may configure the UE with rules to determine whether to transmit in a configured UL transmission or monitor a DL configured resource for DL transmissions from the BS. Alternatively, the rules may be predetermined or pre-defined. The rules may include a configured resource validation rule and a configured resource invalidation rule. For the validation rule, the UE may assume that a UL configured resource is invalid unless the UE receives a UL direction indication (e.g., from an SFI or a semi-static TDD UL-DL configuration) for each symbol in the UL configured resource. Similarly, the UE may assume that a DL configured resource is invalid unless the UE receives a DL direction indication for each symbol in the DL configured resource. For the invalidation rule, the UE may assume that a UL configured resource is valid unless the UE receives a DL indication or a flexible direction indication for a symbol in the UL configured resource. Similarly, the UE may assume that a DL configured resource is valid unless the UE receives a UL indication or a flexible direction indication for a symbol in the DL configured resource. In some other implementations, for the invalidation rule, a UL configured resource may still be valid if the slot or symbols for the UL configured are flexible. Similarly, a DL configured resource may still be valid if the slot or symbols for the DL configured are flexible.

In some aspects, the rule to select between the configured resource validation rule or the configured resource invalidation rule may be based on whether a configured resource is within a BS's COT or outside a BS's COT. For instance, the configured resource validation can be applied to a configured resource within a BS's COT and the configured resource invalidation can be applied to a configured resource outside the BS's COT. In some aspects, the BS may transmit, during a COT, an SFI indicating SFI information for a longer duration than the COT. For instance, the BS may use the SFI to indicate a flexible direction for a configured resource outside of the COT to cancel the configured grant for the configured resource.

In some aspects, the rule to select between the configured resource validation rule or the configured resource invalidation rule may be based on whether the frequency band is in a mmWave band or a non-mmWave band. For instance, the configured resource validation can be applied to a configured resource in a mmWave band and the configured resource invalidation can be applied to a configured resource in a non-mmWave band.

In some aspects, the rule to select between the configured resource validation rule or the configured resource invalidation rule based on whether a frame-based equipment (FBE) contention mode or a load-based equipment (LBE) contention mode is used for acquiring a COT in the shared radio frequency band. For instance, the configured resource validation can be applied when using an FBE contention mode and the configured resource invalidation can be applied when using an LBE contention mode.

Aspects of the present disclosure can provide several benefits. For example, the use of the configured resource invalidation rule allows the UE to utilize a configured resource outside a BS's COT when no SFI is indicated for the configured resource. The use of an SFI to indicate SFI information for a duration longer than a COT allows the BS to cancel a configured grant outside of the BS's COT.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105.

In some aspects, the BS 105 may configure a UE 115 with configured grant resources in a shared radio frequency band (e.g., in a shared spectrum or an unlicensed spectrum) for UL transmissions and/or DL transmissions. Configured grant resources refer to resources that are not scheduled by dynamic scheduling. Configured grant transmissions may also be referred to as unscheduled transmissions, autonomous transmissions, and/or autonomous transmissions. Some configured grant resources may be designated for a particular physical channel (e.g., a PRACH, a PUCCH, a PUSCH, a PDCCH, or a PDSCH). Additionally, the BS 105 may provide a UE 115 with slot format information. In this regard, the BS 105 may indicate an SFI by transmitting a semi-static TDD UL-DL configuration or a dynamic SFI to indicate a transmission direction for each OFDM symbol for one or more slots. The SFI can indicate a UL direction, a DL direction, or a flexible direction for each symbol. A symbol indicated with a UL direction may be used for UL transmission. A symbol indicated with a DL direction may be used for DL transmission. A symbol indicated with a flexible direction may be used for UL or DL transmission. Further, the BS 105 may configure the UE 115 with rules for using the configured resources based on whether the configured resources within a COT of the BS 105 or outside a COT of the BS 105, and whether the UE 115 is configured with SFI indications and/or COT indications as described in greater detail herein.

Figure 2:
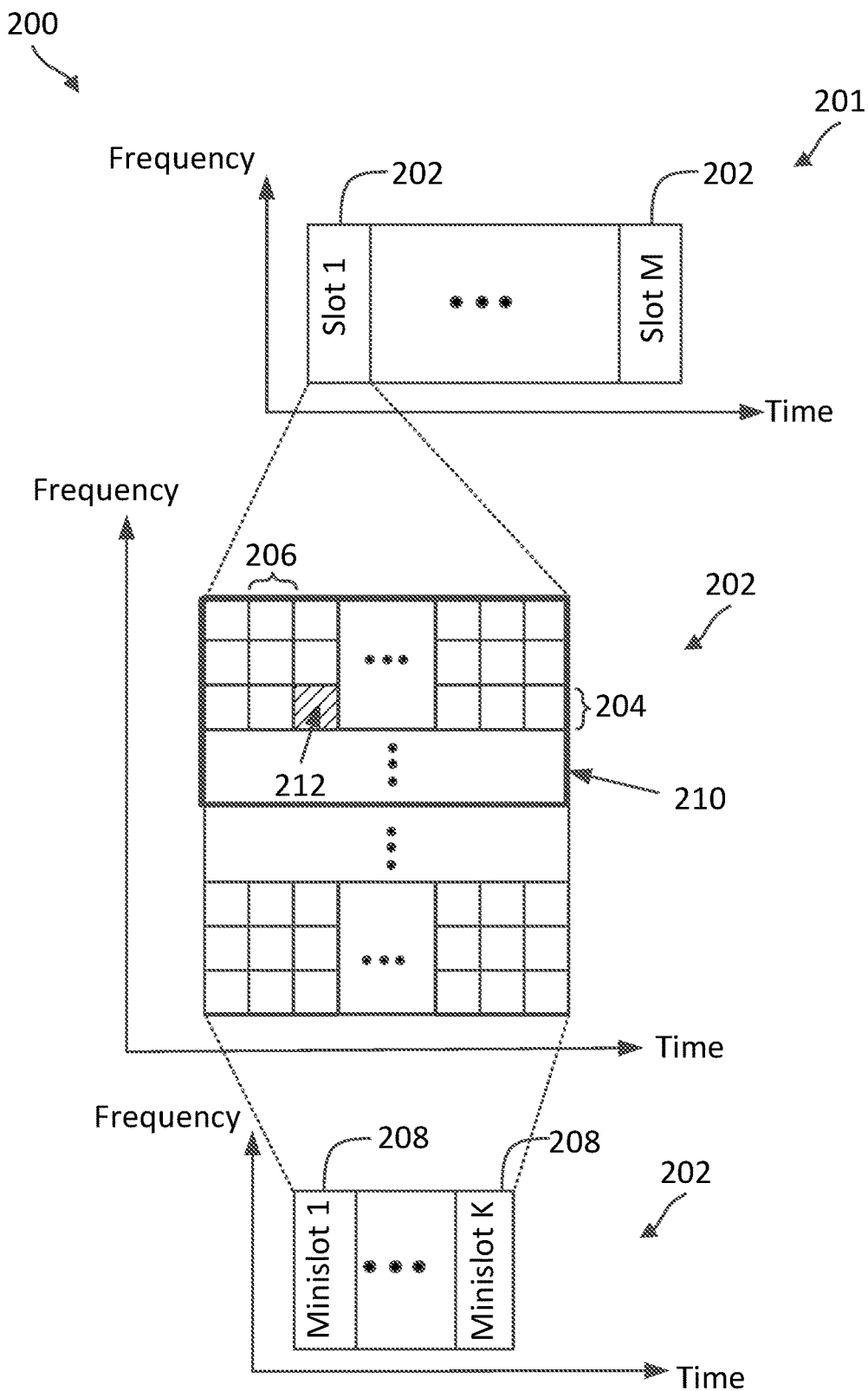
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N-1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
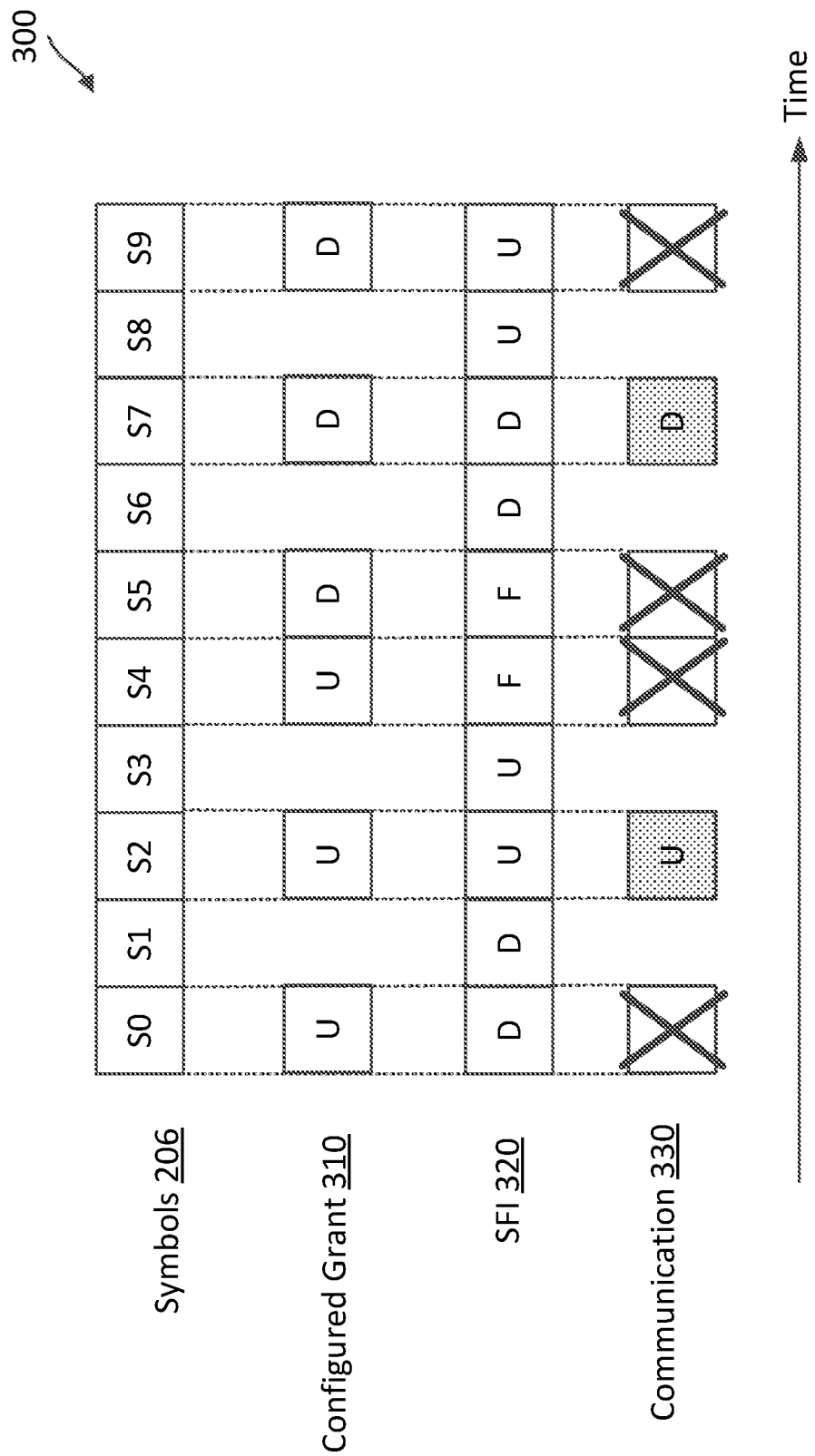
FIG. 3 illustrates a configured grant transmission scheme in a licensed band according to some aspects of the present disclosure.

FIG. 3 illustrates a configured grant transmission scheme 300 in a licensed band according to some aspects of the present disclosure. The scheme 300 may be employed by BSs such as the BSs 105 and UEs such as the UEs 115 in a network such as the network 100 for communications. In particular, the BS and the UE may communicate configured grant transmissions with each other as shown in the scheme 300. In FIG. 3, the x-axis represent time in some arbitrary units. The scheme 300 is described using the same slot or symbol structured as shown in FIG. 2 and may use the same reference numerals as FIG. 2 for simplicity sake. For purposes of simplicity of discussion, FIG. 3 illustrates ten symbols 206 (indexed S0 to S9) and each configured grant 310 with a duration of one symbol 206, though it will be recognized that embodiments of the present disclosure may scale to any suitable number of symbols (e.g., 1-14) and/or slots (e.g., the slots 202) and each configured grant may include any suitable number of symbols 206 (e.g., 1-14).

In the illustrated example of FIG. 3, a BS (e.g., the BSs 105) configures a UE (e.g., the UEs 115) with a number of UL configured grants 310 indicating UL configured resources at symbols 206 indexed S0, S2, and S4 (shown by the symbols U). Additionally, the BS configures the UE with a number of DL configured grants 310 indicating DL configured at symbols 206 indexed S5 S7, and S9 (shown by the symbols D). The BS may indicate the configured grants 310 via an RRC configuration. In some instances, the configured grants 310 may be a semi-static configuration and can be periodic. The BS may further configure the UE with SFI information via an SFI 320. The SFI 320 indicates a transmission direction for each symbol 206, where D represents a DL direction, U represents a UL direction, and F represents a flexible direction. The BS may indicate the SFI 320 via a dynamic DCI signaling (e.g., in a GC-PDCCH DCI format 2.0) or a semi-static RRC configuration (e.g., in a semi-static RRC TDD UL-DL configuration common or a semi-static RRC TDD UL-DL configuration dedicated).

In the scheme 300, the UE validates the transmission direction of a configured resource for UL transmission or DL monitoring. In this regard, the UE may transmit a UL transmission in a UL configured resource if the SFI 320 indicates that the symbols 206 of the corresponding UL configured resource has a UL transmission direction. The UE may refrain from using a UL configured resource for UL transmission if the SFI 320 indicates that the symbols 206 of the corresponding UL configured resource has a DL or flexible transmission direction. Similarly, the UE may monitor for a DL transmission in a DL configured resource if the SFI 320 indicates that the symbols 206 of the corresponding DL configured resource has a DL transmission direction. The UE may refrain from monitoring a DL configured resource if the SFI 320 indicates that the symbols 206 of the corresponding DL configured resource has a UL or flexible transmission direction.

Thus, based on the transmission direction configured for the configured grants 310 and indicated by the SFI 320, the configured grant communication between the BS and the UE is as shown in communication 330. For instance, the UE transmits a UL transmission in the UL configured resource at symbol 206 indexed S2 (shown by the pattern-filled box) since both the configured grant 310 and the SFI 320 indicates that a UL direction for the symbol 206 indexed S2. The UL transmission can include PUSCH data and/or PUCCH control information. However, the UE cancels the use of the UL configured resources at symbols 206 indexed S0 and S4 (shown by the crosses) since the SFI 320 indicates a transmission direction other than the UL direction symbols 206 indexed S0 and S4. Similarly, the UE monitors and receives a DL transmission in the DL configured resource at symbol 206 indexed S7 (shown by the pattern-filled box) since both the configured grant 310 and the SFI 320 indicates that a DL direction for the symbol 206 indexed 7. The DL transmission can include any DL semi-persistent schedule (SPS) transmissions and/or CSI-RS. However, the UE cancels the use of the UL configured resources at symbols 206 indexed S5 and S9 (shown by the crosses) since the SFI 320 indicates a transmission direction other than the DL direction for the symbols 206 indexed S5 and S9.

Figure 4A:
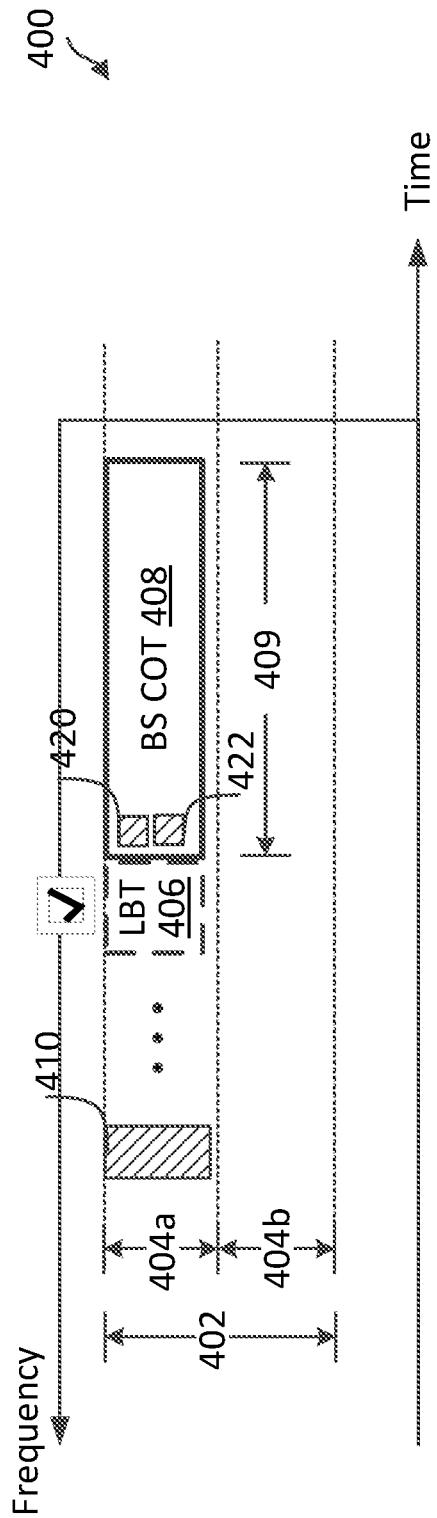
FIG. 4A illustrates a transmission scenario in a shared radio frequency band according to some aspects of the present disclosure.
Figure 4B:
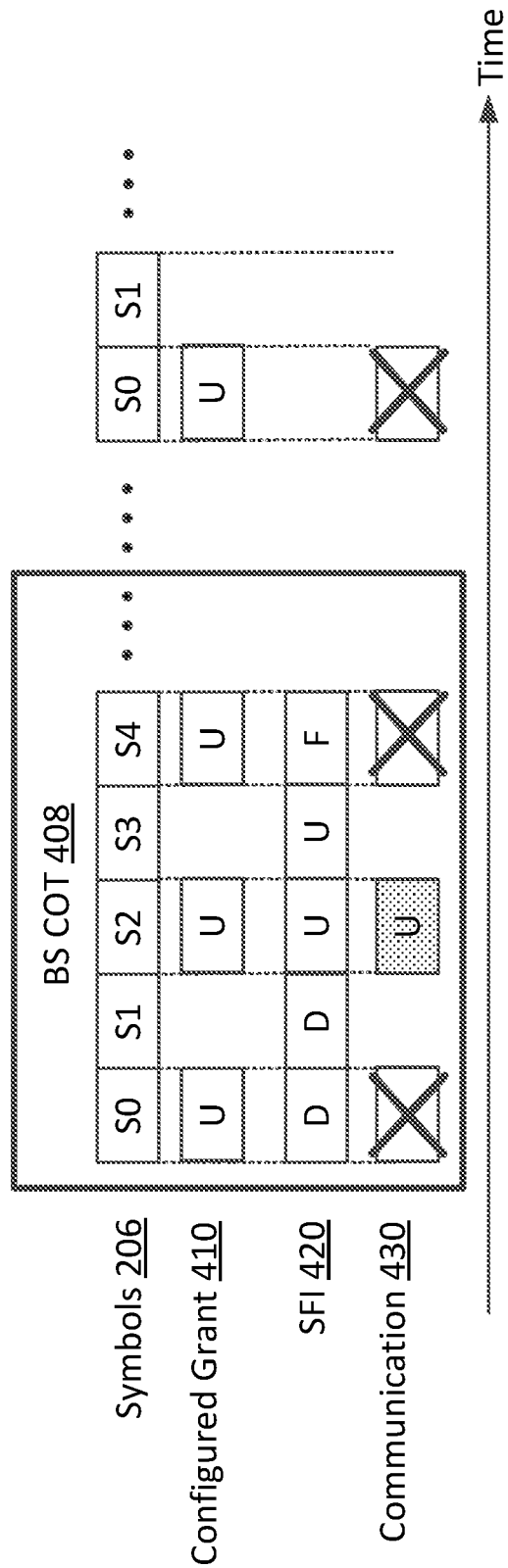
FIG. 4B illustrates a transmission scenario in a shared radio frequency band according to some aspects of the present disclosure.

FIGS. 4A and 4B collectively illustrate a transmission scenario 400 in a shared radio frequency band according to some aspects of the present disclosure. The scenario 400 may correspond to a transmission scenario in the network 100 between a BS 105 and a UE 115 communicating over a shared radio frequency band, which may be in a shared spectrum or an unlicensed spectrum. In FIG. 4A, the x-axis represents time in some arbitrary units, and the y-axis represents frequency in some arbitrary units. In FIG. 4B, the x-axis represents time in some arbitrary units.

Referring to FIG. 4A, a BS (e.g., the BSs 105) communicates with a UE (e.g., the UEs 115) over a frequency band 402. The frequency band 402 may be in a shared spectrum or an unlicensed spectrum. The frequency band 402 may be located at any suitable frequencies and may have any suitable bandwidth. For instance, the frequency band 402 may be at a sub-6 GHz or at a mmWav band. The frequency band 402 may be partitioned into a number of channels or subbands 404. Each subband may have any suitable bandwidth. For instance, each subband 404 may have a channel bandwidth of about 20 MHz. Although FIG. 4A shows two subbands 404, the frequency band 402 can include any suitable number of subbands 404 (e.g., about 3, 4, 5 or more).

In the illustrated example of FIG. 4A, the BS may perform a LBT 406 in the subband 404a to contend for a COT. However, it should be understood that the BS may perform an LBT in any subband 404 and over any suitable number of subbands 404 (e.g., about 2, 3, 4 or more) within the frequency band 402. Upon passing the LBT 406 as shown by the checkmark, the BS acquires a COT 408. The BS may have ownership of the COT 408. The BS may communicate with the UE during the COT 408. The BS may transmit a COT indicator 422 indicating that the BS had acquired the COT 408 so that UEs served by the BS may monitor for DL transmissions (e.g., PDCCH UL and/or DL scheduling grants and/or PDSCH transmission) from the BS. The COT indicator 422 may indicate a duration 409 of the COT 408 and/or a subband 404*a* where the COT 408 is acquired. Accordingly, a monitoring node or UE may be aware of when the BS's COT 408 starts and/or ends based on a detection of the COT indicator 422. The BS may transmit an SFI 410 (e.g., the SFI 320) to indicate transmission directions for symbols (e.g., the symbols 206) within COT 408. In some instances, the COT indicator 422 and the SFI 420 may be transmitted in a single DCI message (e.g., a GC-PDCCH DCI). In some instances, the COT indicator 422 and the SFI 420 may be transmitted in separate messages. The BS may additionally configure the UE with configured grants 410 similar to the configured grants 410, for example, via an RRC configuration. The BS may transmit the configuration for the configured grants 410 during a previous COT of the BS. The BS may also configure the UE with a semi-static RRC TDD UL-DL configuration indicating transmission directions for symbols over a certain duration, which may be periodic. The UE may determine a transmission direction for a symbol based on the semi-static RRC TDD UL-DL configuration and/or the SFI 420 or a combination thereof.

FIG. 4B provides a more detailed view of communications within the COT 408. FIG. 4B is described using the same slot or symbol structured as shown in FIG. 2 and may use the same reference numerals as FIG. 2 for simplicity sake. For purposes of simplicity of discussion, FIG. 4B illustrates five symbols 206 (indexed S0 to S4) and each configured grant 410 with a duration of one symbol 206, though it will be recognized that embodiments of the present disclosure may scale to any suitable number of symbols (e.g., 1-14) and/or slots (e.g., the slots 202) and each configured grant may include any suitable number of symbols 206 (e.g., 1-14). Further, although FIG. 4B illustrates UL configured grants for the COT 408, it should be understood that DL configured grants can also be configured for the COT 408. The BS and the UE may use substantially similar mechanisms described in the scheme 300 for configured grant communications.

As shown, the BS configures the UE with a number of configured grants 410 indicating UL configured resources at symbols 206 indexed S0, S2, and S4 within the BS's COT 408 and at symbol 206 indexed S0 outside the BS's COT 408. The SFI 420 indicates a transmission direction for each symbol 206 within the BS's COT 408, but not for symbols 206 outside the BS's COT 408. The UE may use the same transmission direction validation mechanisms as in the scheme 300 to determine whether to use a UL configured resource for UL transmission. As shown, within the COT 408, the UE transmits a UL transmission in the UL configured resource at symbol 206 indexed S2 (shown by the pattern-filled box communication 430), but not in the symbols 206 indexed S0 and S4 (shown by the crosses). Since the BS's SFI 420 does not provide SFI information outside the COT 408, the UE cannot validate the transmission direction for the configured resource outside the COT 408. Thus, the UE may not transmit in the configured resource at the symbol 206 indexed S0 outside the BS's COT 408 (shown by the cross). Additionally, if the UE misses the detection of the SFI 420, the UE may also cancel the configured transmissions within the BS's COT 408.

Accordingly, the present disclosure provides techniques for a UE to utilize configured resources in a shared radio frequency band for configured communications based on various combinations of COT indications (e.g., the COT indicators 422), SFI indications (e.g., the SFI 420), lack of COT indications, lack of SFI indications, and/or RRC configurations (e.g., configured grants 410 and/or semi-static TDD UL-DL configurations).

Figure 5:
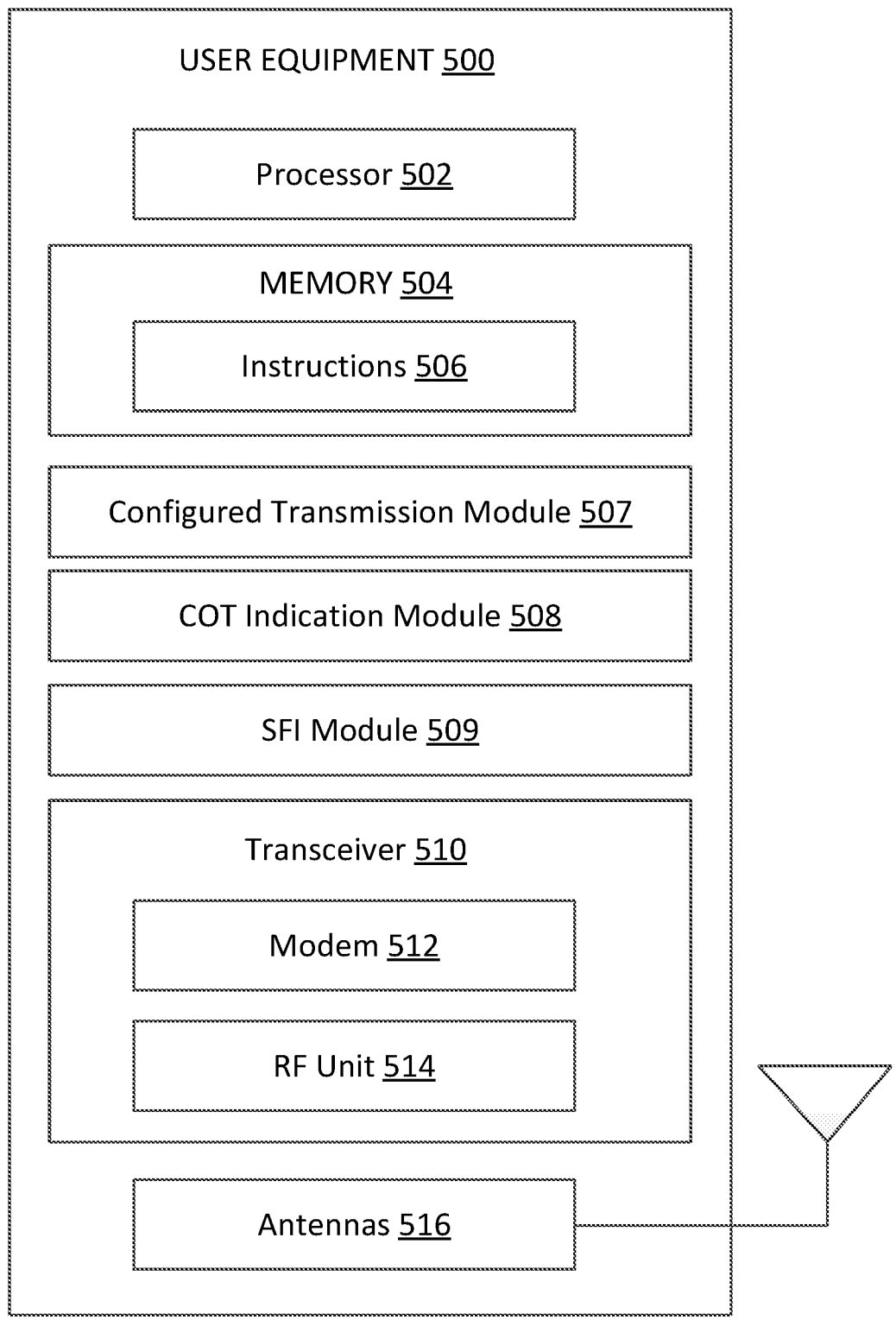
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1. As shown, the UE 500 may include a processor 502, a memory 504, a configured transmission module 507, a COT indication module 508, a SFI module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 6-10, 11A-11C, 12A-12E, and 13. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the configured transmission module 507, the COT indication module 508, and the SFI module 509 may be implemented via hardware, software, or combinations thereof. For example, each of the configured transmission module 507, the COT indication module 508, and the SFI module 509 may be implemented as a processor, circuit, and/or instructions 506 stored in the memory 504 and executed by the processor 502. In some examples, the configured transmission module 507, the COT indication module 508, and the SFI module 509 can be integrated within the modem subsystem 512. For example, the configured transmission module 507, the COT indication module 508, and the SFI module 509 can be implemented by a combination of software components (e.g., executed by a DSP or a general processor) and hardware components (e.g., logic gates and circuitry) within the modem subsystem 512. In some examples, a UE may include one or more of the configured transmission module 507, the COT indication module 508, and the SFI module 509. In other examples, a UE may include all of the configured transmission module 507, the COT indication module 508, and the SFI module 509.

The configured transmission module 507, the COT indication module 508, and the SFI module 509 may be used for various aspects of the present disclosure, for example, aspects of FIGS. 6-10, 11A-11C, 12A-12E, and 13. The configured transmission module 507 is configured to receive configured grants from a BS (e.g., the BSs 105) indicating UL and/or DL configured resources (e.g., time-frequency resources, RBs 210 at certain time periodicity), receive rules indicating how to select between a configured resource validation rule or a configured resource invalidation rule for using a configured resource, validate a UL configured resource and/or a DL configured resources based on the validation rule, invalidate a UL configured resource and/or a DL configured resources based on the invalidation rule, transmit a UL transmission using a valid UL configured resource, and/or monitor a valid DL configured resource for a DL transmission from the BS. In some aspects, the selecting between the configured resource validation rule and the configured resource invalidation rule may be based on whether a configured resource is within a BS's COT or outside a BS's COT. In some aspects, the selecting between the configured resource validation rule and the configured resource invalidation rule may be based on whether a configured resource is in a mmWave band or a non-mm-Wave band. In some aspects, the selecting between the configured resource validation rule and the configured resource invalidation rule may be based on whether a FBE contention mode or a LBE contention mode is used contending for the channel.

The COT indication module 508 is configured to monitor for a COT indication from the BS, determine a duration and/or a frequency band of a BS's COT from a detected COT indication, determine whether a configured resource is within the BS's COT or outside the BS's COT, and provide the detected COT information to the configured transmission module 507.

The SFI module 509 is configured to monitor for SFIs from the BS and provide detected SFI information to the configured transmission module 507 for configured resource validation or configured resource invalidation. Mechanisms for transmitting UL configured transmissions or monitoring for DL configured transmissions in a shared radio frequency band are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the configured transmission module 507 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUSCH data, PUCCH, PRACH) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., configured grants, dynamic PDCCH DCIs, SFIs, semi-static TDD UL-DL configuration, COT indication, PDSCH data, configured resource validation/invalidation selection rules) to the configured transmission module 507 for processing. The antennas 516 may include multiple antennas of similar or different designs in order to sustain multiple transmission links. The RF unit 514 may configure the antennas 516.

In an example, the transceiver 510 is configured to receive, from a base station (BS), an indication of a first configured resource in a shared radio frequency band for a communication in a first direction, receive, from the BS, a first configuration to select between a validation of the first direction or an absence of an invalidation of the first direction for using the first configured resource for the communication, and communicate, with the BS, the communication in the first direction using the first configured resource based on the first configuration, for example, by coordinating with the configured transmission module 507, the COT indication module 508, and the SFI module 509.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
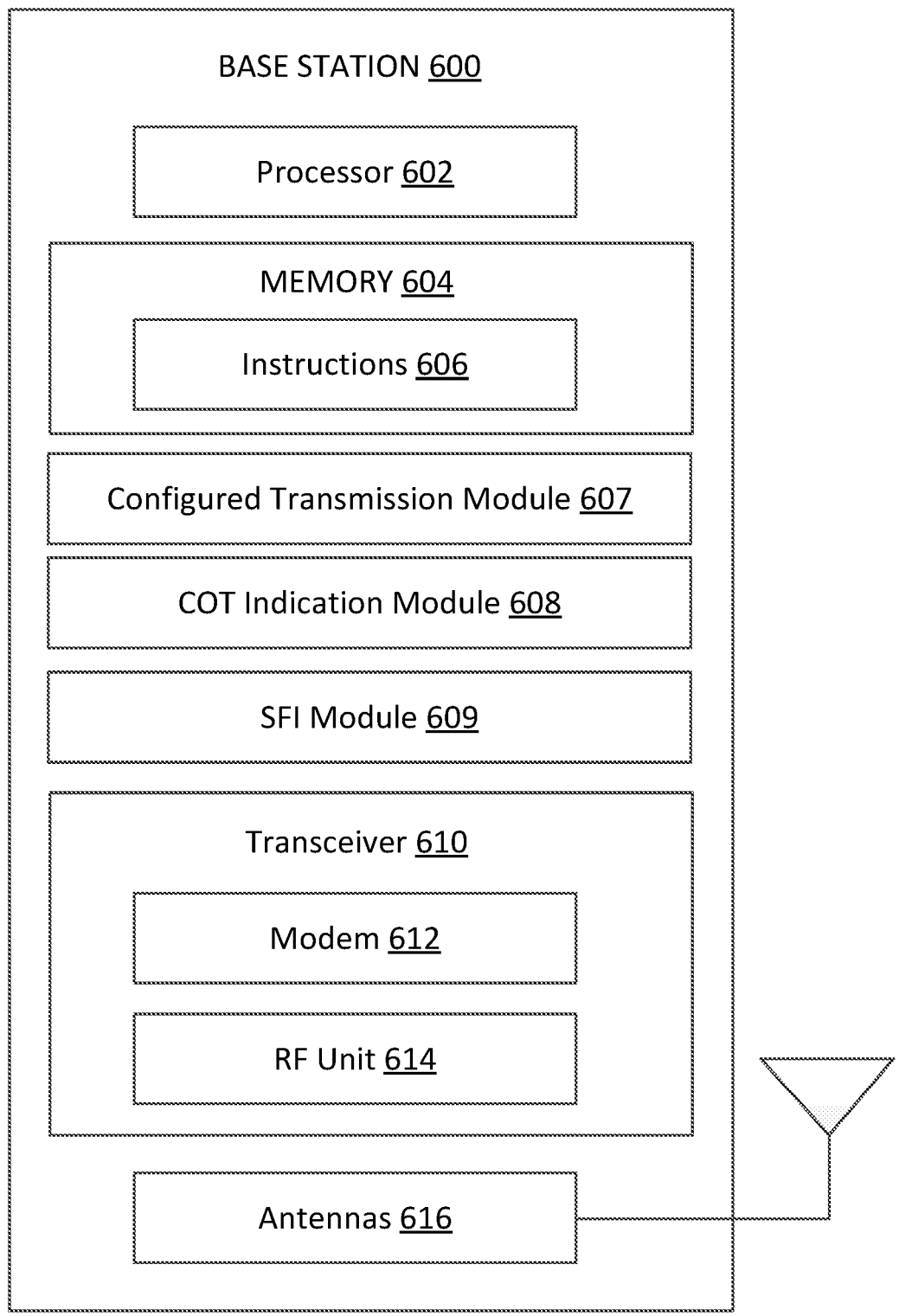
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, a configure transmission module 607, a COT indication module 608, an SFI module 609, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 6-10, 11A-11C, 12A-12E, and 14. Instructions 606 may also be referred to as code, which may be interpreted broadly to include any type of computer-readable statement(s) as discussed above with respect to FIG. 5.

Each of the configured transmission module 607, the COT indication module 608, and the SFI module 609 may be implemented via hardware, software, or combinations thereof. For example, each of the configured transmission module 607, the COT indication module 608, and the SFI module 609 may be implemented as a processor, circuit, and/or instructions 606 stored in the memory 604 and executed by the processor 602. In some examples, the configured transmission module 607, the COT indication module 608, and the SFI module 609 can be integrated within the modem subsystem 612. For example, the configured transmission module 607, the COT indication module 608, and the SFI module 609 can be implemented by a combination of software components (e.g., executed by a DSP or a general processor) and hardware components (e.g., logic gates and circuitry) within the modem subsystem 612. In some examples, a UE may include one or more of the configured transmission module 607, the COT indication module 608, and the SFI module 609. In other examples, a UE may include all of the configured transmission module 607, the COT indication module 608, and the SFI module 609.

The configured transmission module 607, the COT indication module 608, and the SFI module 609 may be used for various aspects of the present disclosure, for example, aspects of FIGS. 6-10, 11A-11C, 12A-12E, and 14. The configured transmission module 607 is configured to transmit configured grants to a UE (e.g., the UEs 115 and/or 500) indicating UL and/or DL configured resources (e.g., time-frequency resources, RBs 210 at certain time periodicity), transmit rules indicating how to select between a configured resource validation rule or a configured resource invalidation rule for using a configured resource, receive a UL transmission using a UL configured resource, transmit a DL semi-persistent schedule (SPS) transmission in a DL configured resource, and/or transmit an SFI to cancel a UL configured grant. In some aspects, the rules for selecting between the configured resource validation rule and the configured resource invalidation rule may be based on whether a configured resource is within a BS's COT or outside a BS's COT. In some aspects, the rules for selecting between the configured resource validation rule and the configured resource invalidation rule may be based on whether a configured resource is in a mmWave band or a non-mmWave band. In some aspects, the rules for selecting between the configured resource validation rule and the configured resource invalidation rule may be based on whether a FBE contention mode or a LBE contention mode is used contending for the channel.

The COT indication module 608 is configured to perform CAT4 LBT to acquire a COT in a shared frequency band and transmit a COT indication to indicate a duration and/or a frequency band of the COT.

The SFI module 609 is configured to transmit SFIs for one or more slots within a COT of the BS 600 or outside a BS's COT to cancel a configured grant outside a BS's COT. In some aspects, the COT indication module 608 and the SFI module 609 may coordinate with each other to transmit a PDCCH DCI including a COT indication and an SFI. Mechanisms for communicating UL and/or DL configured transmissions in a shared radio frequency band are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., configured grants, COT indications, SFIs, configured resource validation/invalidation selection rules, DL SPS transmissions, CSI-RSs) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., configured UL transmissions, PUSCH, PUCCH, PRACH) to the configured transmission module 607, COT indication module 608, and SFI module 609 for processing. The antennas 616 may include multiple antennas of similar or different designs in order to sustain multiple transmission links.

In an example, the transceiver 610 is configured to transmit, to a UE, an indication of a first configured resource in a shared radio frequency band for a communication in a first direction, transmit, to the UE, a first configuration to select between a validation of the first direction or an absence of an invalidation of the first direction for using the first configured resource for the communication, communicate, with the UE, the communication in the first direction using the first configured resource based on the first configuration, for example, by coordinating with the configured transmission module 607, the COT indication module 608, and the SFI module 609.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

As discussed above, a BS (e.g., the BSs 105 and 600) may provide a UE with COT indications (e.g., the COT indicators 422), SFI indications (e.g., the SFI 420 and/or semi-static RCC TDD UL-DL configurations), and/or configured grant configurations (e.g., the configured grants 410). COT indications indicate the temporary ownership of a channel in time and frequency (e.g., as shown by the COT 408 of FIG. 4 in the subband 404a over the duration 409). Dynamic SFIs and/or semi-static TDD UL-DL configurations indicate symbol transmission direction (e.g., UL, DL, or flexible), which may be applicable to durations when the node has ownership of the channel. In some instances, the ownership can be shared by other nodes. For instance, the BS may acquire a COT (e.g., the COT 408) based on a successful CAT4 LBT and may share the COT with the UE. Similarly, the UE may acquire a COT outside of the BS's COT based on a successful CAT4 LBT and may share the COT with the BS. FIGS. 7-12 illustrate various mechanisms for a UE to transmit UL configured transmissions and/or monitor for DL configured transmissions in configured resources within a BS's COT, outside a BS's COT, and/or within a UE's COT.

Figures 7, 8:
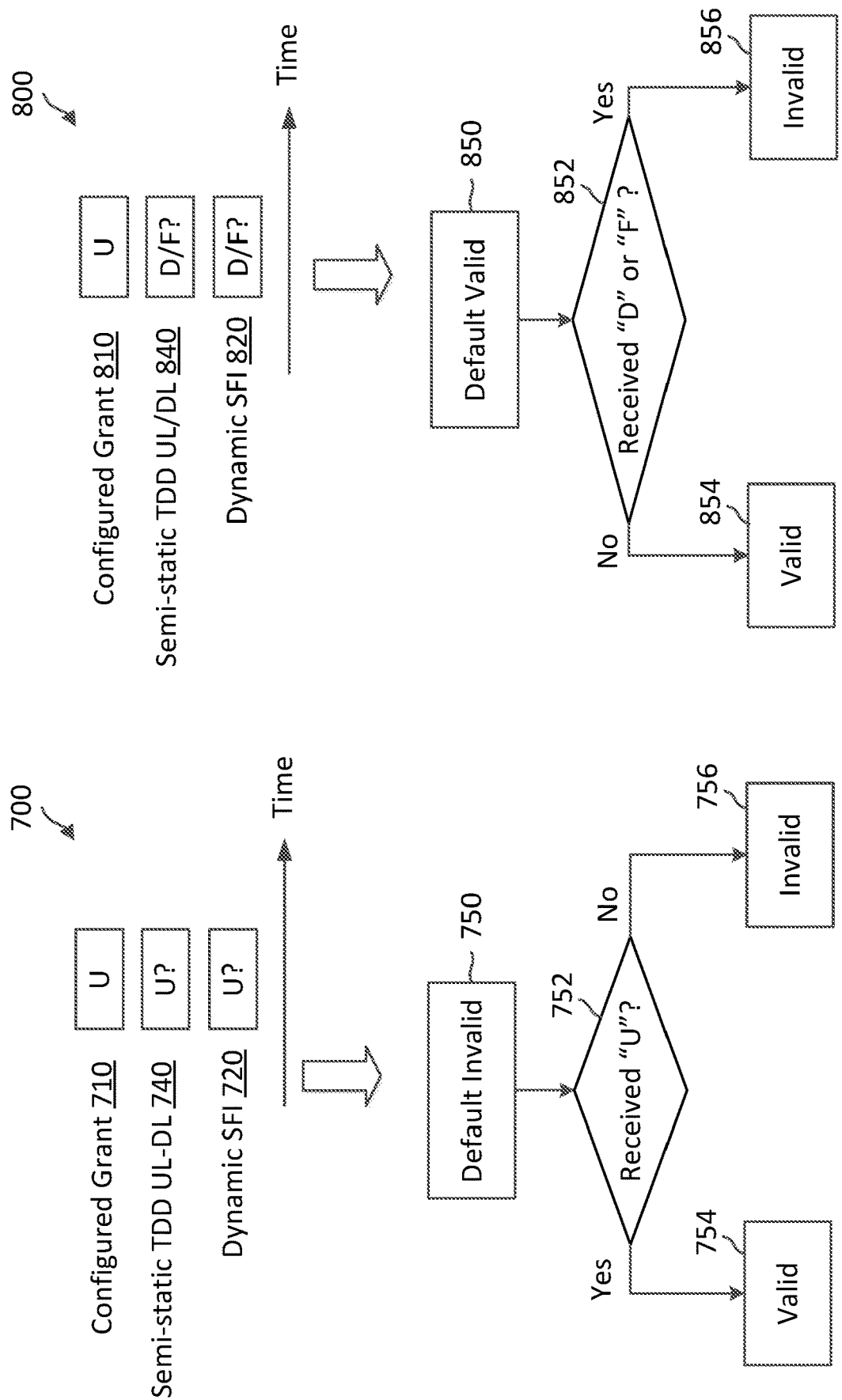
FIG. 7 illustrates a configured grant transmission scheme according to some aspects of the present disclosure.
FIG. 8 illustrates a configured grant transmission scheme according to some aspects of the present disclosure.

FIG. 7 illustrates a configured grant transmission scheme 700 according to some aspects of the present disclosure. The scheme 700 may be employed by BSs such as the BSs 105 and 600 and UEs such as the UEs 115 and 500 in a network such as the network 100 for communications. In particular, the BS and the UE may communicate UL configured grant transmissions based on a transmission direction validation as shown in the scheme 700. In FIG. 7, the x-axis represent time in some arbitrary units. In the scheme 700, a BS (e.g., the BSs 105 and 600) configures a UE (e.g., the UEs 115 and 500) with a UL configured grant 710, for example, via an RRC. The BS may also configure the UE with a semi-static TDD UL-DL configuration 740, for example, via an RRC. The BS may also configure the UE with a dynamic SFI 720, for example, via PDCCH DCI or GC-PDCCH DCI format 2.0. In the scheme 700, the UE may use the configured resource indicated by UL configured grant 710 if the UE can validate that the configured resource is for UL transmission based on receiving a UL indication (U) from the semi-static TDD UL-DL configuration 740 and/or the dynamic SFI 720.

At block 750, the UE defaults the configured resource as invalid for UL configured transmission. In some instances, the UE may store the information related to the configured resources and a corresponding valid flag and/or an invalid flag in the memory 504 and may utilize the processor 502 to set the valid flag to 0 and/or the invalid flag to 1.

At block 752, the UE determines whether a UL indication is received for the UL configured resource from the semi-static TDD UL-DL configuration 740 or the dynamic SFI 720. In some instances, the UE may utilize one or more components, such as the processor 502, the configured transmission module 507, the COT indication module 508, the SFI module 509, the transceiver 510, the modem 512, and the one or more antennas 516, to receive the semi-static TDD UL-DL configuration 740 or the dynamic SFI 720. In some instances, the semi-static TDD UL-DL configuration 740 or the dynamic SFI 720 may be in the form of an index referencing an entry to a slot format table. Each entry in the slot format table may include a transmission direction for each symbol in a slot. The slot format table may be preconfigured or pre-stored at the memory 504. The UE may utilize the processor 502 to look up an entry in the table based on the received the semi-static TDD UL-DL configuration 740 or the dynamic SFI 720 and determine a transmission direction for symbols in the UL configured resource from the table entry. If the UE receives a UL indication, the UE proceeds to block 754.

At block 754, the UE determines that the UL configured resource is valid for UL configured transmission. The UE may proceed with the UL transmission in the UL configured resource. In some instances, the UE may utilize the processor 702 to set the valid flag to 1 and/or the invalid flag to 0.

If the UE fails to receive a UL indication, the UE proceeds to block 756.

At block 756, the UE determines that the UL configured resource is invalid for UL configured transmission and refrain from transmitting in the UL configured resource. In some instances, the UE may utilize the processor 702 to determine not to modify the valid flag or the invalid flag.

While FIG. 7 illustrates the transmission direction validation for UL configured resources, similar mechanisms can be applied to validate DL configured resources. For instance, a UE may monitor for DL transmission in a DL configured resources when the UE receives a DL indication from the semi-static TDD UL-DL configuration 740 and/or the dynamic SFI 720.

FIG. 8 illustrates a configured grant transmission scheme 800 according to some aspects of the present disclosure. The scheme 800 may be employed by BSs such as the BSs 105 and 600 and UEs such as the UEs 115 and 500 in a network such as the network 100 for communications. In particular, the BS and the UE may communicate UL configured grant transmissions based on a transmission direction invalidation as shown in the scheme 800. In FIG. 8, the x-axis represent time in some arbitrary units. In the scheme 800, a BS (e.g., the BSs 105 and 600) configures a UE (e.g., the UEs 115 and 500) with a UL configured grant 810, for example, via an RRC configuration. The BS may also configure the UE with a semi-static TDD UL-DL configuration 840, for example, via an RRC configuration. The BS may also configure the UE with a dynamic SFI 820, for example, via PDCCH DCI or GC-PDCCH DCI format 2.0. In the scheme 800, the UE may use the configured resource indicated by UL configured grant 810 if the UE does not receive a semi-static TDD UL-DL configuration 840 or the dynamic SFI 820 indicating a DL direction (D) or a flexible direction (F) invalidating the UL configured resource.

At block 850, the UE defaults the configured resource as valid for UL configured transmission. In some instances, the UE may store the information related to the configured resources and a corresponding valid flag and/or an invalid flag in the memory 504 and may utilize the processor 502 to set the valid flag to 1 and/or the invalid flag to 0.

At block 852, the UE determines whether a DL indication or a flexible indication is received for the UL configured resource from the semi-static TDD UL-DL configuration 840 or the dynamic SFI 820. In some instances, the UE may utilize substantially similar mechanisms as in the block 752 to determine whether a DL indication or a flexible indication is received for the UL configured resource from the semi-static TDD UL-DL configuration 840 or the dynamic SFI 820. If the UE does not detect any DL or flexible indication, the UE proceeds to block 854.

At block 854, the UE determines that the UL configured resource is valid for UL configured transmission. The UE may proceed with the UL transmission in the UL configured resource. If the UE receives a DL indication or a flexible indication, the UE proceeds to block 856. In some instances, the UE may utilize the processor 702 to determine not to modify the valid flag or the invalid flag.

At block 856, the UE determines that the UL configured resource as invalid for UL configured transmission and refrain from transmitting in the UL configured resource. In some instances, the UE may utilize the processor 702 to set the valid flag to 0 and/or the invalid flag to 1.

While FIG. 8 illustrates the invalidation for UL configured resources, similar mechanisms can be applied to invalidate DL configured resources. For instance, a UE may monitor for DL transmission in a DL configured resources when the UE does not detect any UL indication or flexible indication for the DL configured resources.

Figure 9:
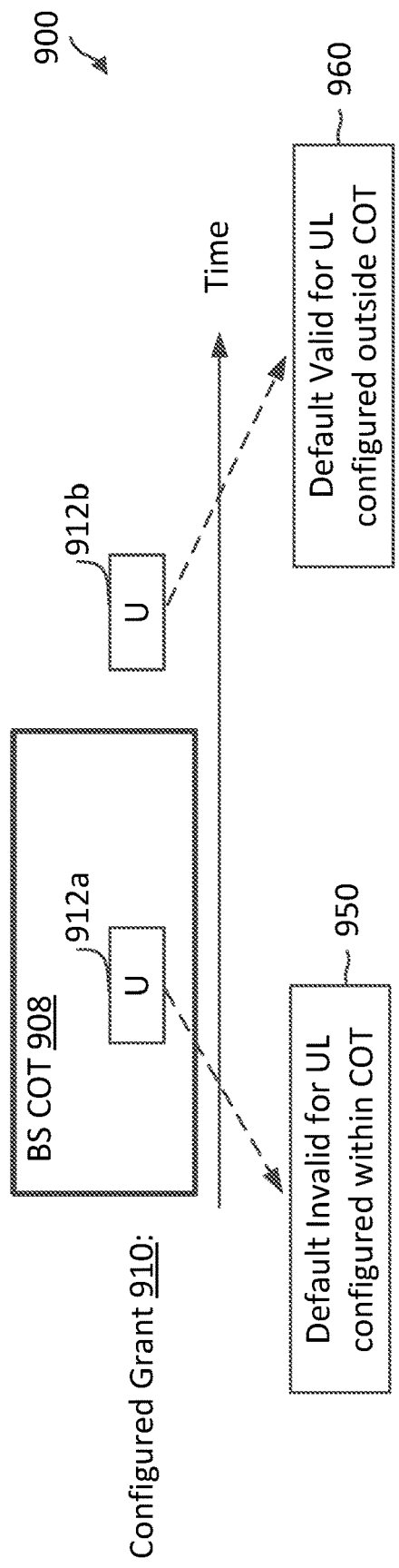
FIG. 9 illustrates a configured grant transmission scheme according to some aspects of the present disclosure.
Figure 10:
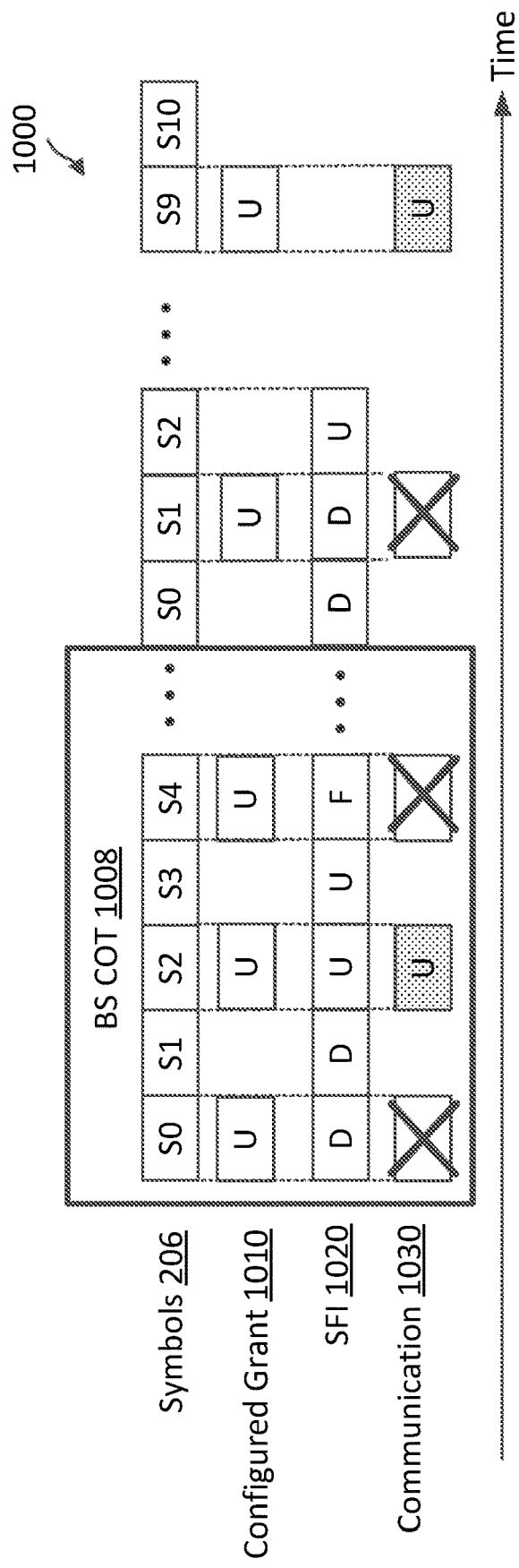
FIG. 10 illustrates a configured grant transmission scenario according to some aspects of the present disclosure.

FIGS. 9-11 illustrates various mechanisms for a BS (e.g., the BSs 105 and 600) to define rules for a UE (e.g., the UEs 115 and 500) to select between validation of configured resources (shown in the scheme 700) or invalidation of configured resources (shown in the scheme 800).

FIG. 9 illustrates a configured grant transmission scheme 900 according to some aspects of the present disclosure. The scheme 900 may be employed by BSs such as the BSs 105 and 600 and UEs such as the UEs 115 and 500 in a network such as the network 100 for communications. In particular, the BS may configure the UE to select between a configured resource validation or a configured resource invalidation as shown in the scheme 900. Alternatively, the UE may perform the selection based on a predefined rule as shown in the scheme 900. In FIG. 9, the x-axis represent time in some arbitrary units. In the scheme 900, a BS (e.g., the BSs 105 and/or 600) configures a UE (e.g., the UEs 115 and/or 500) with a UL configured grant 910, for example, via RRC signaling. The configured grant 910 may indicate UL configured resources 912. In some instance, the UL configured resources 912 may be periodic resources. Depending on when the BS can successfully acquire a COT 908 in the channel (e.g., the frequency band 402), a UL configured resource 912 can be within a duration of a COT of the BS or outside the BS's COT. The BS may acquire the COT 908 based on a successful CAT LBT. In the illustrated example of FIG. 9, a UL configured resource 912a is within the BS's COT 908 and a UL configured resource 912b is outside the BS's COT 908.

Additionally, the BS configures the UE with a rule 950 for using configured resources within a BS's COT and a rule 960 for using configured resources outside a BS's COT. In some other instances, the rules 950 and 960 and/or when to apply the rules 950 and 960 may be predetermined, for example, specified by a certain wireless communication protocol. The rule 950 indicates that a UL configured resource 912a within the BS's COT 908 is default to invalid for UL configured transmission. The UE may implement the configured resource validation mechanisms in discussed in scheme 700 for using the configured resource 912a within the BS's COT 908 for UL transmission. For instance, the UE may transmit in the configured resource 912a if the UE receives a COT indication (e.g., the COT indicator 422) with a duration including the configured resource 912a and an SFI (e.g., the SFI 420) including a UL indication for symbols in the configure resource 912a.

The rule 960 indicates that a UL configured resource 912b outside the BS's COT 908 is default to valid for UL configured transmission. The UE may implement the configured resource invalidation mechanisms discussed in scheme 800 for using the configured resource 912b outside the BS's COT 908 for UL transmission. For instance, the UE may transmit in the configured resource 912b if the UE determines the configured resource 912b is not within any BS's COT and no received SFI (e.g., the SFI 420) indicating an DL indication or a flexible indication for symbols in the configure resource 912b.

In some aspects, instead of applying the configured resource invalidation rule 960 to configured resources outside a BS's COT, the BS may configure the UE to use configured resources outside a BS's COT based on a successful CAT4 LBT irrespective of any transmission direction indication from a dynamic SFI or a semi-static TDD UL-DL configuration.

In some aspects, instead of applying the configured resource invalidation rule 960 to configured resources outside a BS's COT, the BS may configure the UE to refrain from using configured resources outside a BS's COT irrespective of any transmission direction indication from a dynamic SFI or a semi-static TDD UL-DL configuration.

While FIG. 9 illustrates the invalidation for UL configured resources, similar mechanisms can be applied to invalidate DL configured resources. For instance, a UE may monitor for DL transmission in a DL configured resources within a BS's COT using the rule 950 and may monitor for DL transmission in a DL configured resources outside a BS's COT using the rule 960.

FIG. 10 illustrates a configured grant transmission scenario 1000 according to some aspects of the present disclosure. The scenario 1000 may correspond to a configured grant transmission scenario in the network 100 between a BS 105 and a UE 115 communicating over a shared radio frequency band, which may be in a shared spectrum or an unlicensed spectrum, when applying the scheme 900 of FIG. 9. In FIG. 10, the x-axis represents time in some arbitrary units. FIG. 10 is described using the same slot or symbol structured as shown in FIG. 2 and may use the same reference numerals as FIG. 2 for simplicity sake. For purposes of simplicity of discussion, FIG. 10 illustrates five symbols 206 (indexed S0 to S4) and each configured grant 410 with a duration of one symbol 206, though it will be recognized that embodiments of the present disclosure may scale to any suitable number of symbols (e.g., 1-14) and/or slots (e.g., the slots 202) and each configured grant may include any suitable number of symbols 206 (e.g., 1-14). Further, although FIG. 10 illustrates UL configured grants for a BS's COT 1008, it should be understood that DL configured grants can also be configured for the COT 1008.

In the illustrated example of FIG. 10, the BS acquires a COT 1008 in a channel (e.g., the frequency band 402) based on a successful CAT4 LBT. The BS configures the UE with a number of configured grants 1010 indicating UL configured resources at symbols 206 indexed S0, S2, and S4 within the BS's COT 1008 and at symbols 206 indexed S1 and S9 outside the BS's COT 1008. The BS provides the UE with an SFI 1020 indicates transmission directions for each symbol 206 within the BS's COT 1008. The UE may apply the rule 950 for configured grants 1010 within the BS's COT 1008. As shown by the communication 1030, the UE transmits a UL transmission (shown by the pattern-filled box) in the UL configured resource at symbol 206 indexed S2, but not in the symbols 206 indexed S0 and S4 (shown by the crosses).

In some aspects, the BS may transmit an SFI 1020 indicating transmission directions for a duration longer the COT 1008, for example, to cancel a configured transmission outside the BS's COT 1008. In this regard, the SFI 1020 may indicate transmission directions for symbols 206 indexed S0, S1, and S2 outside the BS's COT 1008. The BS may indicate a transmission direction (e.g., a DL or flexible indication) other than the UL direction for the symbol 206 indexed S1 outside the BS's COT 1008 to cancel the configured grant. The UE may apply the invalidation rule 960 for determining whether to use the configured resource outside the BS's COT 1008. Since the SFI 1020 indicates a DL direction for the symbol 206 indexed S1 outside the BS's COT 1008, the UE refrains from using the configured resource in the symbol 206 indexed S1 outside the BS's COT 1008 for UL transmission (shown by the cross). Accordingly, a configured resource outside a BS's COT 1008 can be cancelled by an SFI 1020 communicated during an earlier BS COT's 1008.

Since the SFI 1020 does not provide a transmission direction for the symbol 206 indexed S9 outside the BS's COT 1008, the UE may transmit a UL transmission (shown by the patter-filled box) in the configured resource located at the symbol 206 indexed S9 outside the BS's COT 1008 based on the invalidation rule 960.

Figure 11A:
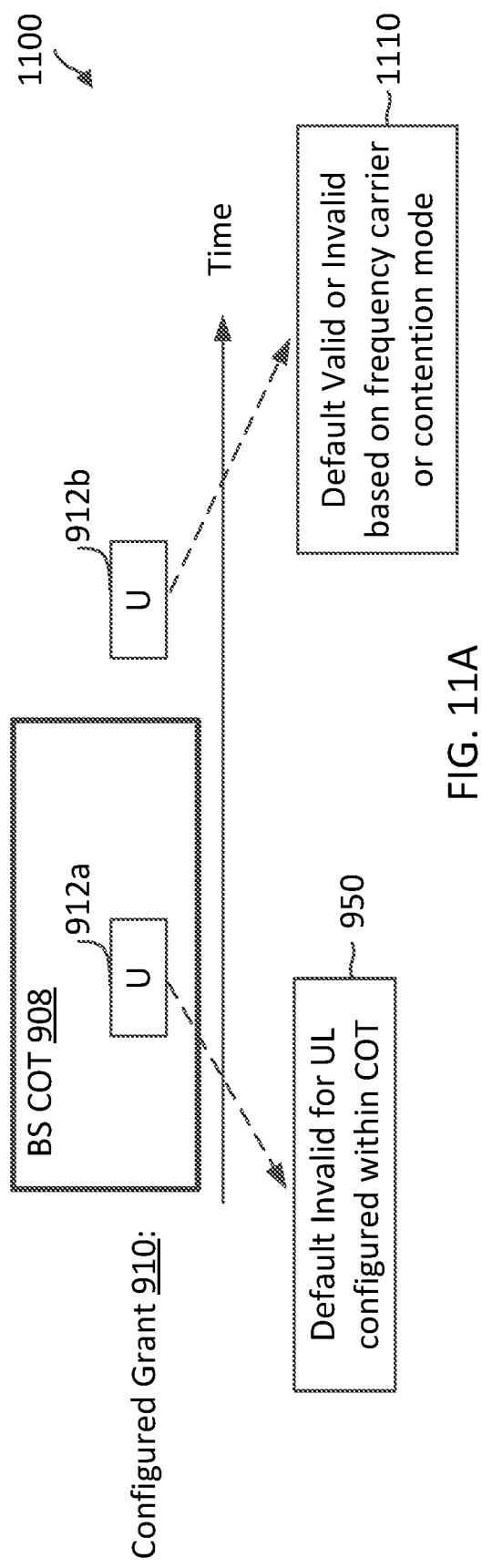
FIG. 11A illustrates a configured grant transmission scenario according to some aspects of the present disclosure.
Figure 11C:
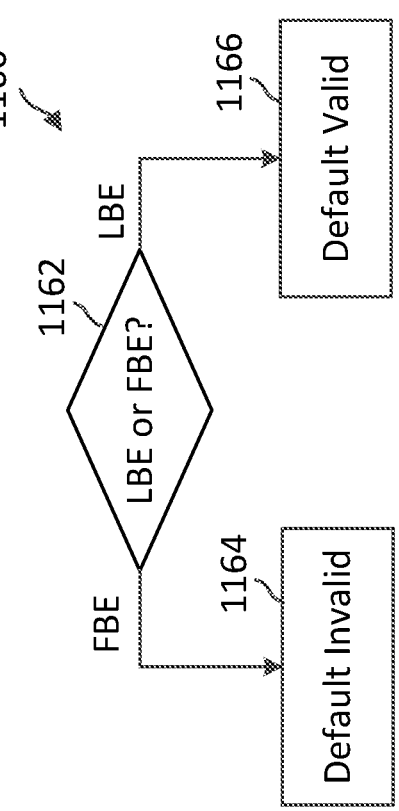
FIG. 11C illustrates a configured grant transmission scheme according to some aspects of the present disclosure.
Figure 11B:
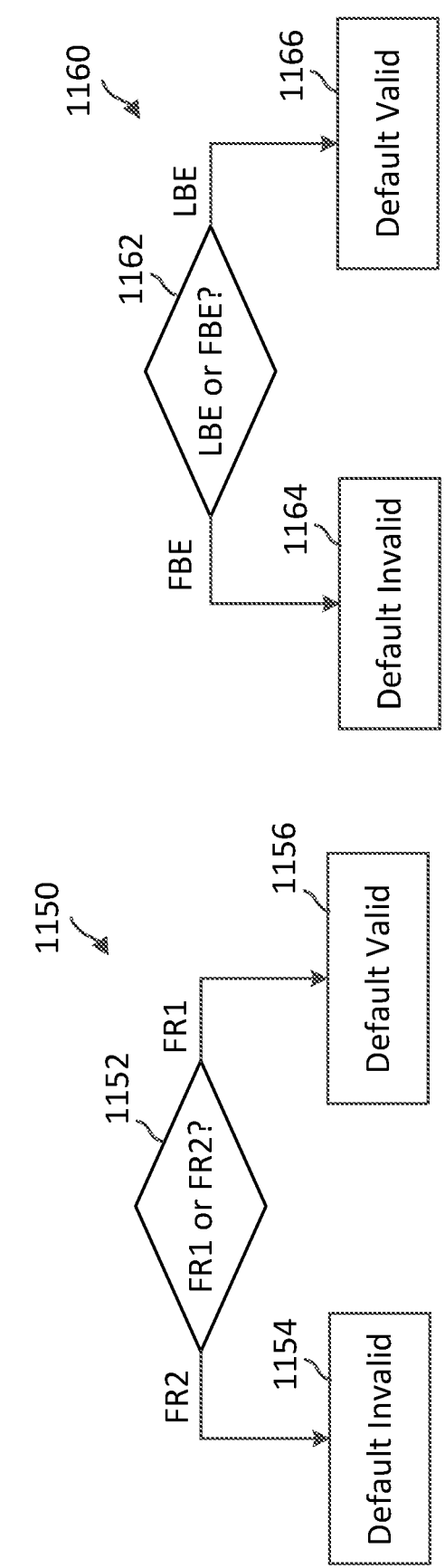
FIG. 11B illustrates a configured grant transmission scheme according to some aspects of the present disclosure.

FIGS. 11A-11C collectively illustrates a scheme 1100 for configured transmissions in a shared radio frequency band (e.g., the frequency band 402). The scheme 1100 may be employed by BSs such as the BSs 105 and 600 and UEs such as the UEs 115 and 500 in a network such as the network 100 for communications. In particular, the BS may configure the UE to select between a configured resource validation rule or a configured resource invalidation rule as shown in the scheme 1100. FIG. 11A illustrates a configured grant transmission scenario according to some aspects of the present disclosure. FIG. 11A is illustrated using the same configured grant and COT acquisition scenario as in FIG. 9, and may use the same reference numerals as in FIG. 9 for simplicity sake. In FIG. 11A, the x-axis represent time in some arbitrary units. FIG. 11B illustrates a configured grant transmission scheme 1150 according to some aspects of the present disclosure. FIG. 11C illustrates a configured grant transmission scheme 1160 according to some aspects of the present disclosure. In some other instances, the schemes 950 and 1160 and/or when to apply the schemes 950 and 1160 may be predetermined, for example, specified by a certain wireless communication protocol.

In FIG. 11A, a BS (e.g., the BSs 105 and 600) configures a UE (e.g., the UEs 115 and/or 500) with the same configured resource validation rule 950 for using a configured resource 912*a* within the BS's COT 908. However, the BS configures the UE with a different rule 1110 for using a configured resource 912*b* outside the BS's COT 908. In the scheme 1100, the selection rule 1110 for using the configured resource 912*b* is dependent on an operating frequency carrier (shown in FIG. 11B) or a contention mode (shown in FIG. 11C) for transmitting in the in the configured resource 912*b*.

Referring to FIG. 11B, the scheme 1150 selects between the configured resource transmission validation or the configured resource transmission invalidation based on a frequency carrier of operation, for example, whether the frequency carrier is in a frequency range 1 (FR1) or a frequency range 2 (FR2). FR1 refers to sub-6 GHz frequency and FR2 refers to mmWave frequency (e.g., above 24.25 GHz). The operating frequency carrier refers to the frequency band where the BS communicates with the UE.

At block 1152, the UE determines whether the operating frequency carrier is in a FR1 or a FR2. In some instances, the UE may store operational information such as the operating frequency carrier in the memory 504 and may utilize the processor 502 to look up the operational information from the memory 504 to determine if the operating frequency carrier is in a FR1 or FR2. If the UE determines that the operating frequency carrier is in a FR2, the UE proceeds to block 1154.

At block 1154, the UE defaults the configured resource 912*b* outside the BS's COT 1108 as invalid for UL transmission. In some instances, the UE may store the information related to the configured resource 912*b* and a corresponding valid flag in the memory 504 and may utilize the processor 502 to set the valid flag to 0. The UE may use the configured resource 912*b* if an SFI (e.g., the SFIs 420, 720, 820) indicates a UL direction for each symbol (e.g., the symbols 206) in the configured resource 912*b*. For instance, the UE may implement the scheme 700 at the block 1154.

If the UE determines that the operating frequency carrier is in a FR1, the UE proceeds to block 1156. At block 1156, the UE defaults the configured resource 912*b* outside the BS's COT 1108 as valid for UL transmission. In some instances, the UE may store the information related to the configured resource 912*b* and a corresponding valid flag in the memory 504 and may utilize the processor 502 to set the valid flag to 1.

The UE may use the configured resource 912*b* if the UE does not detect any SFI indicating a DL direction or a flexible direction for symbols in the configured resource 912*b*. For instance, the UE may implement the scheme 800 at the block 1156.

As can be observed, when a communication is over a frequency carrier in the FR2, the configured resource validation rule is used for validating a configured resource outside a BS's COT. When a communication is over a frequency carrier in the FR1, the configured resource invalidation rule is used for invalidating a configured resource outside a BS's COT. When a configured resource is within a BS's COT, the configured resource transmission direction validation rule may be used irrespective of whether the operating frequency carrier is in FR1 or FR2. The application of the configured resource invalidation rule for configured resources outside of a BS's COT in a FR2 can provide several benefits. For instance, communications in the FR2 is directional. The use of the configured resource invalidation requires the UE to receive a confirmation from the BS that the BS is ready to receive a UL transmission from the UE in the UL configured resource. Thus, the UE can avoid transmitting a UL transmission to the BS while the BS is transmitting a DL transmission to another UE.

Referring to FIG. 11C, the scheme 1160 selects between the configured resource transmission validation or the configured resource transmission invalidation based on a contention mode, whether an LBE-based or FBE-based LBT is used for acquiring a COT in the channel. An LBE mode refers to sensing at any time instant and random backoff. For instance, a transmitting node may perform a CAT2 or CAT4 LBT at any time based on traffic requirements. If the LBT fails, the UE may perform a random backoff and attempt to contend for the channel again when CAT4 LBT is used. An FBE mode refers to sensing at fixed time instants and backoff with a fixed duration. For instance, a channel may be partitioned into predetermined TXOP slots for sharing. Each TXOP slot may have a corresponding sensing time for contenting for the TXOP slot. A transmitting node, which may be a BS, may perform sensing or LBT at the corresponding sensing time to contend for the TXOP slot.

At block 1162, the UE determines whether the contention mode is LBE-based or FBE-based. In some instances, the UE may store operational information such as contention mode in the memory 504 and may utilize the processor 502 to look up the operational information from the memory 504 to determine if the contention mode is LBE-based or FBE-based. If the UE determines that the contention mode is FBE based, the UE proceeds to block 1164.

At block 1164, the UE defaults the configured resource 912b outside the BS's COT 1108 as invalid for UL transmission. In some instances, the UE may store the information related to the configured resource 912b and a corresponding valid flag in the memory 504 and may utilize the processor 502 to set the valid flag to 0.

The UE may use the configured resource 912b if an SFI (e.g., the SFIs 420, 720, 820) indicates a UL direction for each symbol (e.g., the symbols 206) in the configured resource 912b. For instance, the UE may implement the scheme 700 at the block 1164.

If the UE determines that the contention mode is LBE-based, the UE proceeds to block 1166. At block 1166, the UE defaults the configured resource 912b outside the BS's COT 1108 as valid for UL transmission. In some instances, the UE may store the information related to the configured resource 912b and a corresponding valid flag in the memory 504 and may utilize the processor 502 to set the valid flag to 1.

The UE may use the configured resource 912b if the UE does not detect any SFI indicating a DL direction or a flexible direction for symbols in the configured resource 912b. For instance, the UE may implement the scheme 800 at the block 1166.

As can be observed, when a communication is based on an FBE-based contention, the configured resource validation rule is used. When a communication is based on an LBE-based contention, the configured resource invalidation rule is used. When a configured resource is within a BS's COT, the configured resource validation rule may be used irrespective of whether the contention mode is FBE-based or LBE-based.

In some aspects, a BS (e.g., the BSs 105 and/or 500) may configure a UE (e.g., the UEs 115 and/or 600) to use any suitable combinations of the schemes 700, 800, 900, 1150, and/or 1160 to select between the configured resource transmission direction validation rule or the configured resource transmission direction invalidation rule for using a UL configured resource or DL configured resource. In some instances, the BS may configure the UE with different configured resource usage rules for different configured resources. For instance, the BS may configure the UE to use the configured resource validation rule for configured resources corresponding to one physical channel (e.g. configured grant resource) and use the configure resource invalidation rule for configured resources corresponding to another physical channel (e.g. physical random access channel), for example, for communications in FR1 and/or communications with LBE-based contention. In some other instances, the BS may configure the UE with the same configured resource usage rule for different configured resources. For instance, the BS may configure the UE to use the configured resource validation rule for configured resources corresponding to one physical channel (e.g. configured grant resource) and/or corresponding to another physical channel (e.g. physical random access channel), for example, for communications in FR2, communications with FBE-based contention, communications in FR2 with LBE-based contention, and/or communications in FR1 with FBE-based contention.

FIGS. 12A-12E collectively illustrate configured transmission mechanisms in a shared radio frequency band (e.g., the frequency band 402). In FIGS. 12A-12E, the schemes 1200, 1250, 1260, 1270, and 1280 may be employed by BSs such as the BSs 105 and 600 and UEs such as the UEs 115 and 500 in a network such as the network 100 for communications. In particular, the BS may communicate UL and/or DL configured transmissions with the UE as shown in the schemes 1200, 1250, 1260, 1270, and 1280. Additionally, the x-axes represent time in some arbitrary units.

Figure 12A:
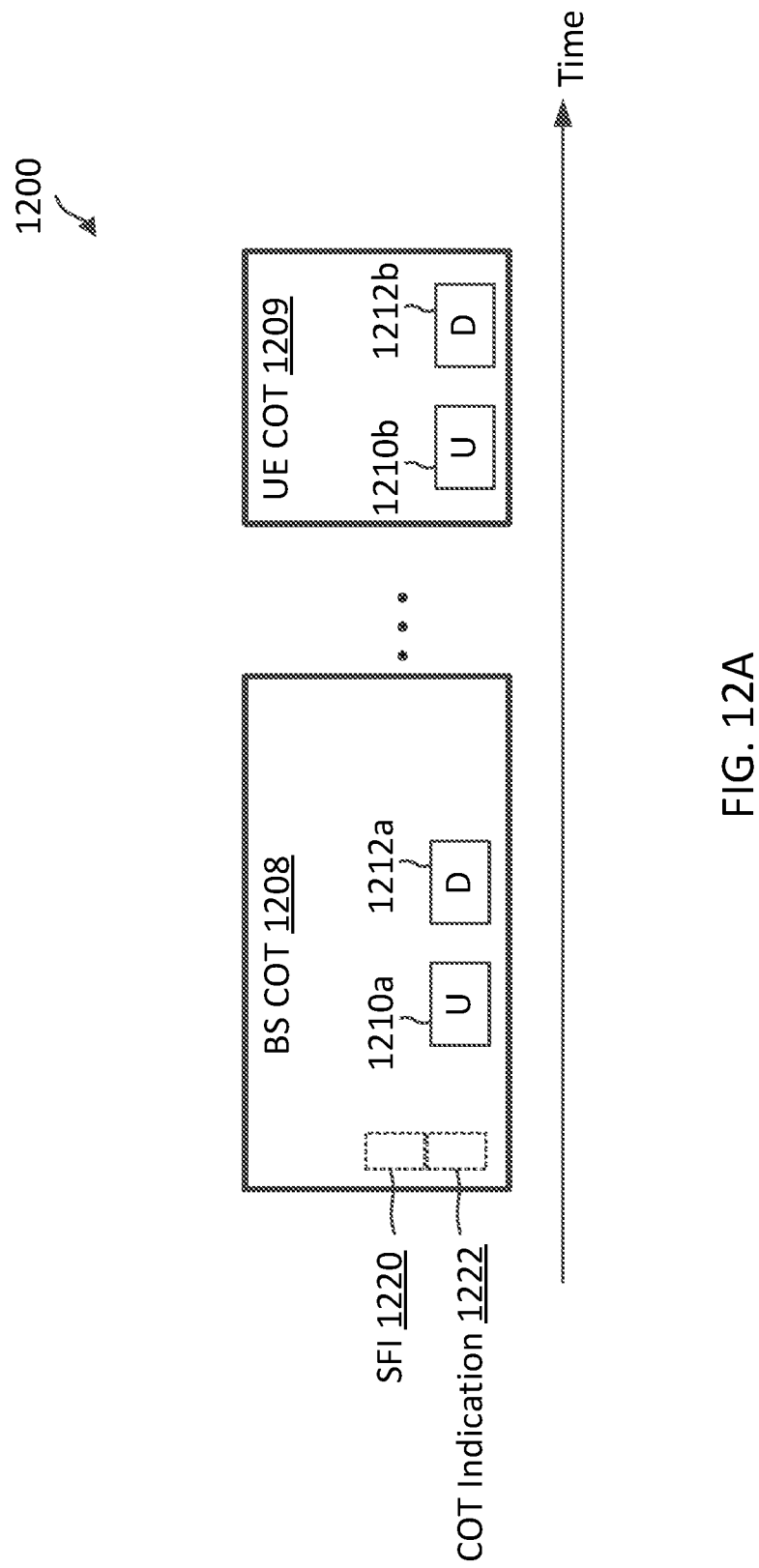
FIG. 12A illustrates a configured grant transmission scheme according to some aspects of the present disclosure.

FIG. 12A illustrates a configured grant transmission scheme 1200 according to some aspects of the present disclosure. In the scheme 1200, a BS (e.g., the BSs 105 and 600) configures a UE (e.g., the UEs 115 and/or 500) with UL configured resources 1210 and DL configured resources 1212, for example, via an RRC configured grant configuration. In some instances, the configured resources 1210 and 1212 may be periodic resources. Depending on when the BS can successfully acquire a COT 1208 in the channel (e.g., the frequency band 402), the configured resources 1210 and 1212 can be within a duration of a COT of the BS or outside the BS's COT. The BS may acquire the COT 1208 based on a successful CAT LBT. In the illustrated example of FIG. 12, the configured resource 1210a and 1212a are within a duration of the BS's COT 1208 and the configured resources 1210b and 1212b are outside the BS's COT 1208. When the UE determines to use a configured resource 1210b or 1212b that are outside the BS's COT 1208, the UE may perform a CAT4 LBT to acquire a COT 1209. The COT 1209 can be referred to as a UE COT since the UE has ownership of the COT 1209.

In some aspects, the BS may configure the UE to monitor for SFI 1220 or COT indication 1222. For instance, the BS may configure the UE with SFI monitoring occasions (e.g., time-frequency resources). The BS may indicate to the UE that the BS may provide the UE with COT indication 1222 and/or SFI 1220. As discussed above, COT indication and SFI can be signaled via a DCI message. In some instances, the BS may indicate that the UE can expect a DCI message including a COT indication 1222 and a SFI 1220. This may be referred to as a COT indication configured, SFI configured condition. In some instances, the BS may indicate that the UE can expect a DCI message including a COT indication 1222, but no SFI. This may be referred to as a COT indication configured, SFI not configured condition. In some instances, the BS may indicate that the UE can expect a DCI message including an SFI 1220, but no COT indication. This may be referred to as a no COT indication configured, SFI configured condition. In some instances, the BS may indicate that the UE may not expect COT indication and SFI information. This may be referred to as a no COT indication configured, no SFI configured condition. Depending on whether COT indication is configured and/or SFI is configured, configured transmissions may be performed differently.

Figure 12B:
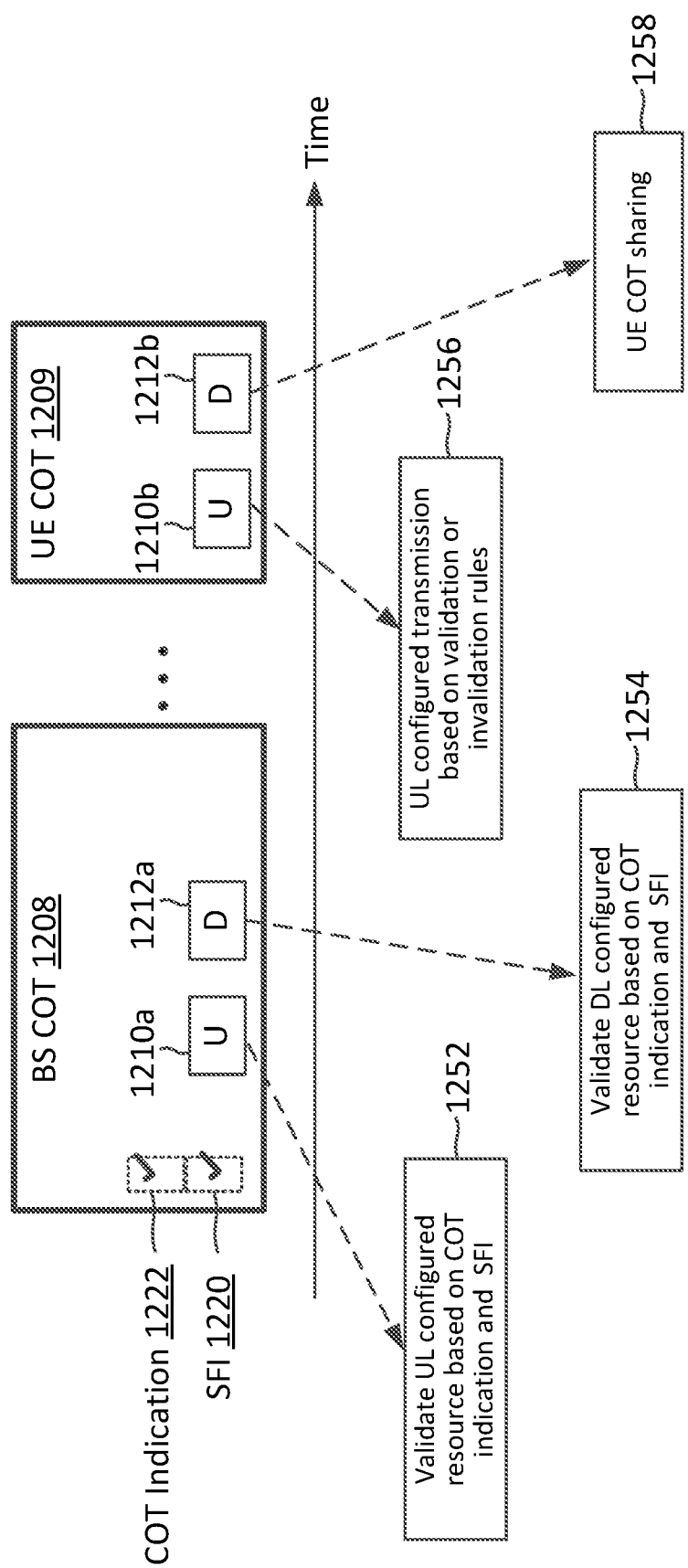
FIG. 12B illustrates a configured grant transmission scheme according to some aspects of the present disclosure.

FIG. 12B illustrates a configured grant transmission scheme 1250 according to some aspects of the present disclosure. In particular, the scheme 1250 illustrates configured transmission mechanisms under a COT indication configured, SFI configured condition as shown by the checkmarks for the COT indication 1222 and the SFI 1220.

At block 1252, for the UL configured resource 1210a within the BS COT's 1208, the UE may validate the UL configured resource 1210a based on the COT indication 1222 and further based on the SFI 1220. For instance, the UE may detect a COT indication 1222 from the BS and may determine that the UL configured resource 1210a is within the BS's COT 1208 based on the COT indication 1222. The UE may additionally receive an SFI 1220 for the COT 1208. The UE may validate the UL configured resource 1210a based on whether the SFI 1220 indicates a UL direction for symbols in the configured UL resource 1210a. If the SFI 1220 indicates a UL direction for symbols in the configured UL resource 1210a, the UE may transmit a UL transmission (e.g., PRACH, PUCCH and/or PUSCH transmission) in the UL configured resource 1210a. The UE may share the BS's COT 1208 by performing a CAT2 LBT prior to the UL transmission. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220 and perform channel energy measurement or signal detection for LBT. The UE may store information related to the configured resources 1210a and a corresponding valid flag and/or an invalid flag in the memory 504 and may utilize the processor 502 to set the valid flag and/or the invalid flag based on the SFI 1220 and the COT indication 1222. At block 1254, for the DL configured resource 1212a within the BS COT's 1208, the UE may validate the DL configured resource 1212a based on the COT indication 1222 and further based on the SFI 1220. For instance, the UE may detect a COT indication 1222 from the BS and may determine that the DL configured resource 1212a is within the BS's COT 1208 based on the COT indication 1222. The UE may additionally receive an SFI 1220 for the COT 1208. The UE may validate the DL configured resource 1210a based on whether the SFI 1220 indicates a DL direction for symbols in the configured DL resource 1212a. If the SFI 1220 indicates a DL direction for symbols in the configured DL resource 1212a, the UE may monitor the DL configured resource 1212a for a DL transmission (e.g., a CSI-RS, a DL SPS PDSCH transmission) from the BS. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220. The UE may store information related to the configured resources 1212a and a corresponding valid flag and/or an invalid flag in the memory 504 and may utilize the processor 502 to set the valid flag and/or the invalid flag based on the SFI 1220 and the COT indication 1222.

At block 1256, for the UL configured resource 1210b outside he BS COT's 1208, the UE may apply a configured resource validation rule or a configured resource invalidation rule using the schemes 900 and/or 1100. When the UE determines that the UL configured resource 1210b can be used for UL transmission, the UE acquires a COT 1209 by performing a CAT4 LBT. Upon passing the LBT, the UE transmits the UL transmission in the UL configured resource 1210b. In some instances, the BS may cancel the UL configured transmission using the SFI 1220 to indicate a flexible direction or a DL direction for symbols in the UL configured resource 1210b as discussed in the scenario 1000. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220 and perform channel energy measurement or signal detection for LBT. The UE may store information related to the configured resources 1210b and a corresponding valid flag and/or an invalid flag in the memory 504 and may utilize the processor 502 to set the valid flag and/or the invalid flag based on the SFI 1220 and the COT indication 1222.

At block 1258, for the DL configured resource 1212b outside he BS COT's 1208, the BS may share the UE's COT 1209. However, the BS may not share the UE's COT 1209 with another UE. The BS may transmit a COT indication when sharing the UE's COT 1209 using similar mechanisms as the COT indication 1222. The BS may cancel anther UE's configured resource in the UE's COT 1209 using an SFI indication, for example, to indicate a flexible direction for symbols in the other UE's configured resource, as discussed in the scenario 1000. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220. The UE may store information related to the configured resources 1212b and a corresponding valid flag and/or an invalid flag in the memory 504 and may utilize the processor 502 to set the valid flag and/or the invalid flag based on the SFI 1220 and the COT indication 1222.

Figure 12C:
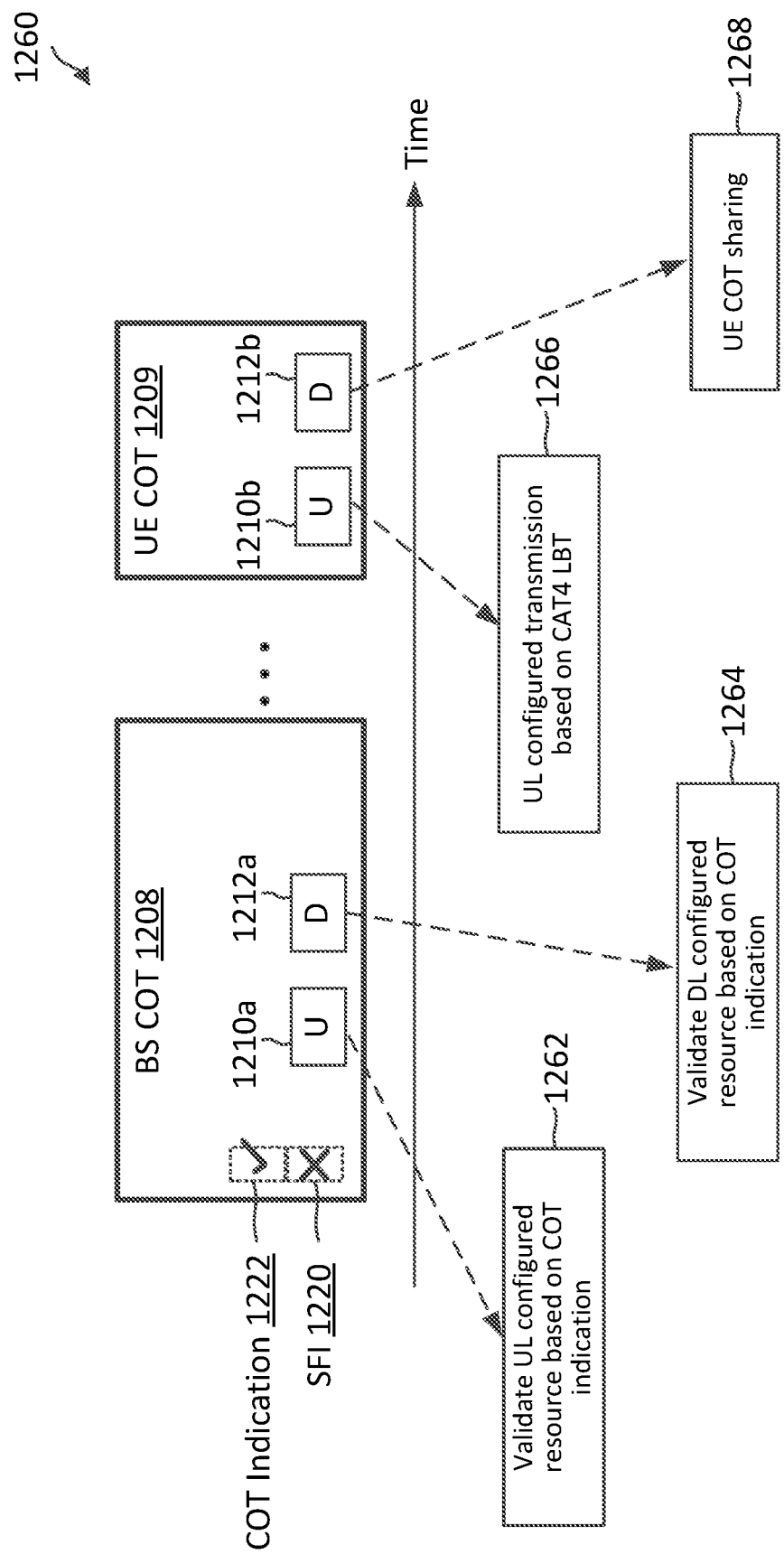
FIG. 12C illustrates a configured grant transmission scheme according to some aspects of the present disclosure.

FIG. 12C illustrates a configured grant transmission scheme 1260 according to some aspects of the present disclosure. In particular, the scheme 1260 illustrates configured transmission mechanisms under a COT indication configured, SFI not configured condition as shown by the checkmark for the COT indication 1222 and cross symbol for the SFI 1220.

At block 1262, for the UL configured resource 1210a within the BS COT's 1208, the UE may validate the UL configured resource 1210a based on the COT indication 1222. For instance, the UE may detect a COT indication 1222 from the BS and may determine that the UL configured resource 1210a is within the BS's COT 1208 based on the COT indication 1222a. The UE may share the BS's COT 1208. For instance, the UE may perform a CAT2 LBT prior to the UL configured resource 1210a and may transmit a UL transmission (e.g., PRACH, PUCCH and/or PUSCH transmission) upon passing the CAT2 LBT. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220 and perform channel energy measurement or signal detection for LBT. The UE may store information related to the configured resources 1210a and a corresponding valid flag and/or an invalid flag in the memory 504 and may utilize the processor 502 to set the valid flag and/or the invalid flag based on the COT indication 1222.

At block 1264, for the DL configured resource 1212a within the BS COT's 1208, the UE may validate the DL configured resource 1212a based on the COT indication 1222. For instance, the UE may detect a COT indication 1222 from the BS and may determine that the DL configured resource 1212a is within the BS's COT 1208 based on the COT indication 1222. The UE may monitor the DL configured resource 1212a for a DL transmission (e.g., a CSI-RS, a DL SPS PDSCH transmission) from the BS. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220. The UE may store information related to the configured resources 1212a and a corresponding valid flag and/or an invalid flag in the memory 504 and may utilize the processor 502 to set the valid flag and/or the invalid flag based on the COT indication 1222.

At block 1266, for the UL configured resource 1210b outside the BS COT's 1208, the may acquire a UE COT 1209 by performing a CAT4 LBT and transmits a UL transmission in the UL configured resource 1210b upon passing the CAT4 LBT. In some instances, the BS may configure UE to not perform transmission on UL configured resource 1210b outside the BS COT's 1208. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220 and perform channel energy measurement or signal detection for LBT. The UE may store information related to the configured resources 1210a and a corresponding valid flag and/or an invalid flag in the memory 504 and may utilize the processor 502 to set the valid flag and/or the invalid flag based on the COT indication 1222.

At block 1268, for the DL configured resource 1212b outside the BS COT's 1208, the BS may share the UE's COT 1209. However, the BS may not share the UE's COT 1209 with another UE. The BS may indicate transmit a COT indication when sharing the UE's COT 1209 using similar mechanisms as the COT indication 1222. However, since there is no SFI configured, the BS may use a COT sharing flag to indicate that the other UE is not allowed to share the BS's COT within the UE's COT 1209 for UL or DL transmission. In some instances, the UE may utilize one or more components, such as the processor 502, the configured transmission module 507, the COT indication module 508, the SFI module 509, the transceiver 510, the modem 512, and the one or more antennas 516, to detect the COT indication 1222 and the SFI 1220. The UE may store information related to the configured resources 1210a and a corresponding valid flag and/or an invalid flag in the memory 504 and may utilize the processor 502 to set the valid flag and/or the invalid flag based on the COT indication 1222.

Figure 12D:
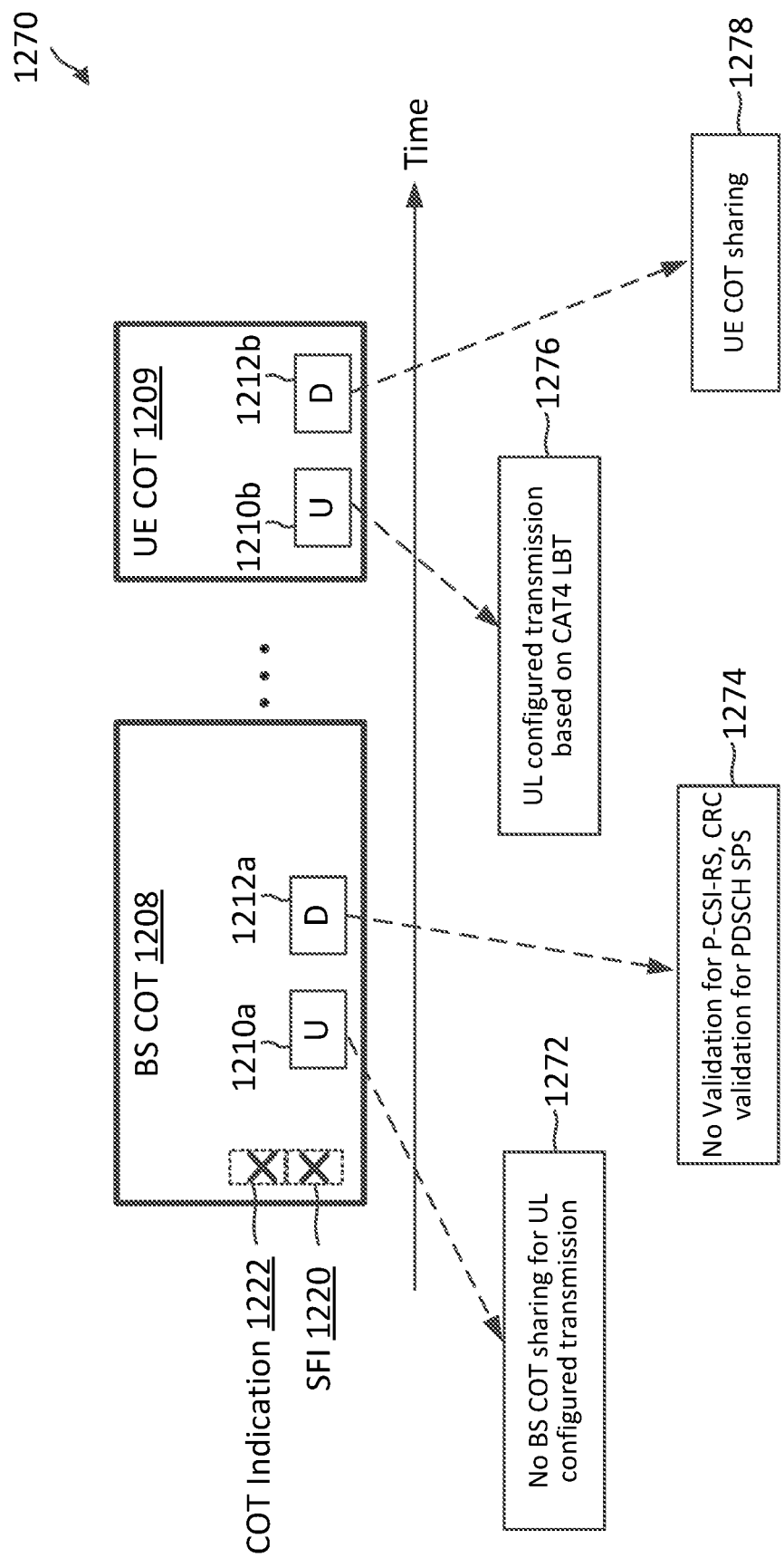
FIG. 12D illustrates a configured grant transmission scheme according to some aspects of the present disclosure.

FIG. 12D illustrates a configured grant transmission scheme 1270 according to some aspects of the present disclosure. In particular, the scheme 1270 illustrates configured transmission mechanisms under a COT indication not configured, SFI not configured condition as shown by the cross symbols for the COT indication 1222 and the SFI 1220.

At block 1272, for the UL configured resource 1210a within the BS COT's 1208, the UE may not share the BS's COT 1208 since there is no COT indication 1222. Thus, the UE may perform a CAT4 LBT prior to UL configured resource 1210a and proceed with transmitting a UL transmission in the UL configured resource 1210a upon passing the LBT. In some instances, the UE may utilize one or more components, such as the processor 502, the configured transmission module 507, the COT indication module 508, the SFI module 509, the transceiver 510, the modem 512, and the one or more antennas 516, to perform channel energy measurement or signal detection for LBT.

At block 1274, for the DL configured resource 1212a within the BS COT's 1208, the UE may not be able to validate a periodic-CSI-RS (P-CSI-RS) transmission since there is no COT indication. The UE may monitor for DL SPS PDSCH transmission and may determine whether a DL SPS PDSCH transmission is received based on a PDSCH CRC validation. In some instances, the UE may utilize one or more components, such as the processor 502, the configured transmission module 507, the COT indication module 508, the SFI module 509, the transceiver 510, the modem 512, and the one or more antennas 516, to receive schedules for P-CSI-RS and/or DL SPS PDSCH and receive P-CSI-RS and/or DL SPS PDSCH according to corresponding schedules.

At block 1276, for the UL configured resource 1210b outside the BS COT's 1208, the UE may acquire a COT 1209 by performing a CAT4 LBT. Upon passing the LBT, the UE transmits the UL transmission in the UL configured resource 1210b. In some instances, the UE may utilize one or more components, such as the processor 502, the configured transmission module 507, the COT indication module 508, the SFI module 509, the transceiver 510, the modem 512, and the one or more antennas 516, to perform channel energy measurement or signal detection for LBT and transmit the UL transmission.

At block 1278, for the DL configured resource 1212b outside the BS COT's 1208, the BS may share the UE's COT 1209 for DL configured transmission. However, the BS may not share the UE's COT 1209 with another UE. In some instances, the UE may utilize one or more components, such as the processor 502, the configured transmission module 507, the COT indication module 508, the SFI module 509, the transceiver 510, the modem 512, and the one or more antennas 516, to transmit a PUCCH signal including a flag indicating that the BS may share the UE's COT 1209.

In some aspects, where there is no COT indication configured and no SFI indication configured, the BS may avoid configuring DL SPS transmissions.

Figure 12E:
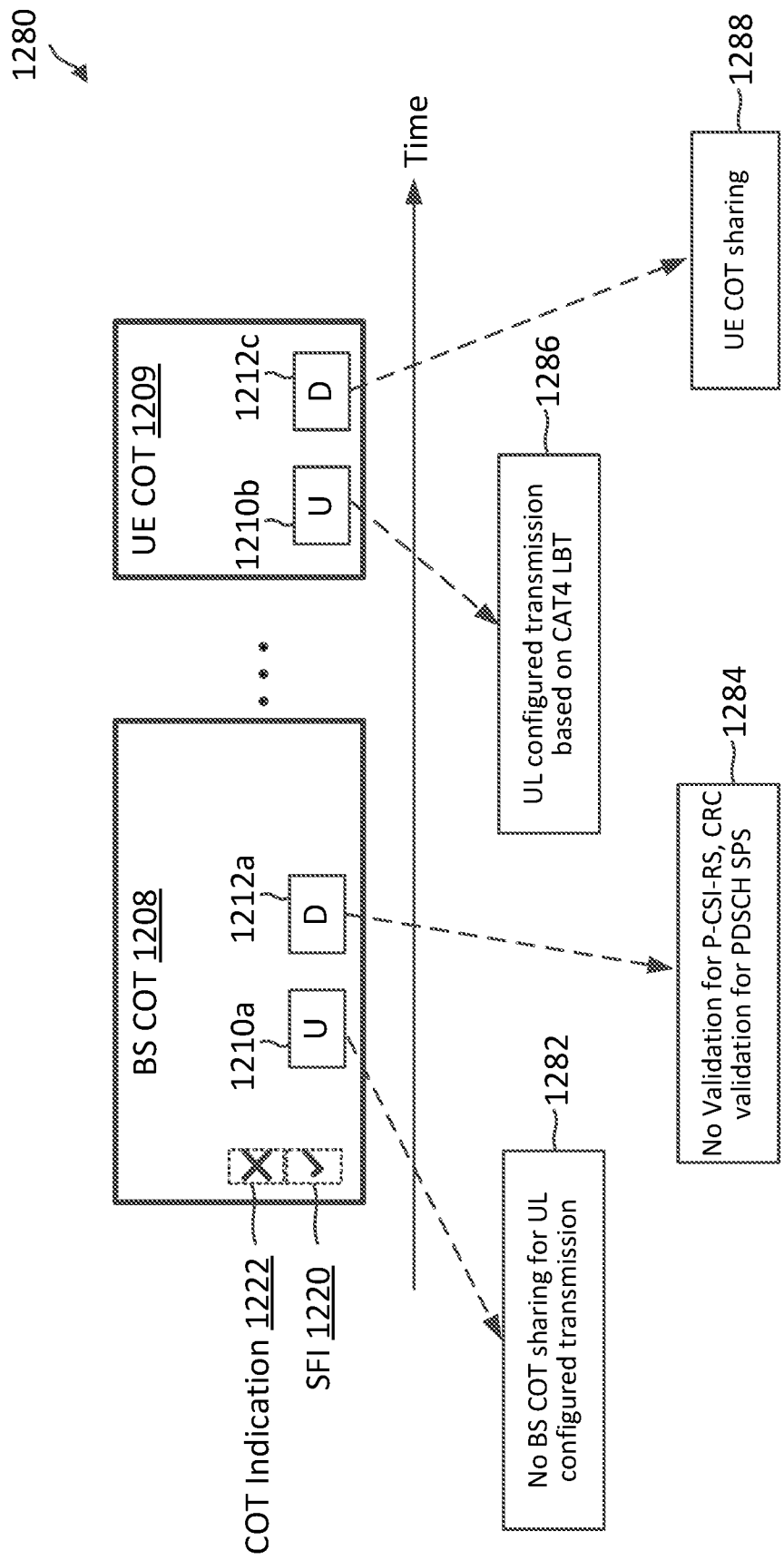
FIG. 12E illustrates a configured grant transmission scheme according to some aspects of the present disclosure.

FIG. 12E illustrates a configured grant transmission scheme 1280 according to some aspects of the present disclosure. In particular, the scheme 1280 illustrates configured transmission mechanisms under a COT indication not configured, SFI configured condition as shown by the cross symbol for the COT indication 1222 and the checkmark for the SFI 1220.

Generally speaking, the scheme 1280 includes features similar to scheme 1270 in many respects. For example, blocks 1282, 1284, 1286, and 1288 are similar to blocks 1272, 1274, 1276, and 1278, respectively. Accordingly, for sake of brevity, details of those steps will not be repeated here. Please refer to the corresponding descriptions above. However, the BS may cancel a UL configured transmission at the block 1282 and/or 1286 using the SFI 1220 to indicate a flexible direction or a DL direction for symbols in the UL configured resource 1210a and/or the UL configured resource 1210b.

In some aspects, within a UE COT (e.g., the UE COT 1209), if SFI is configured, but the UE fails to detect an SFI covering a UL configured resource in the UE COT, the UE may apply the configured resource invalidation rule when operating with LBE in FR1. If a UE is allowed to acquire a UE COT in a FBE mode, the configured resource invalidation rule may also be applied when using a FBE mode. When operating with LBE in FR2, the configured resource validation rule may apply. For instance, if a BS is serving in a beam direction X, the BS may not want the UE to transmit in a beam direction Y (different from the beam direction X). Since the UE may not detect COT indication or SFI in the beam direction Y, the UE may use a CAT4 LBT to acquire a UE COT for UL transmission. Thus, the use of the configured resource validation rule may avoid having the UE to transmit in the beam direction Y while the BS is serving the beam direction X.

Figure 13:
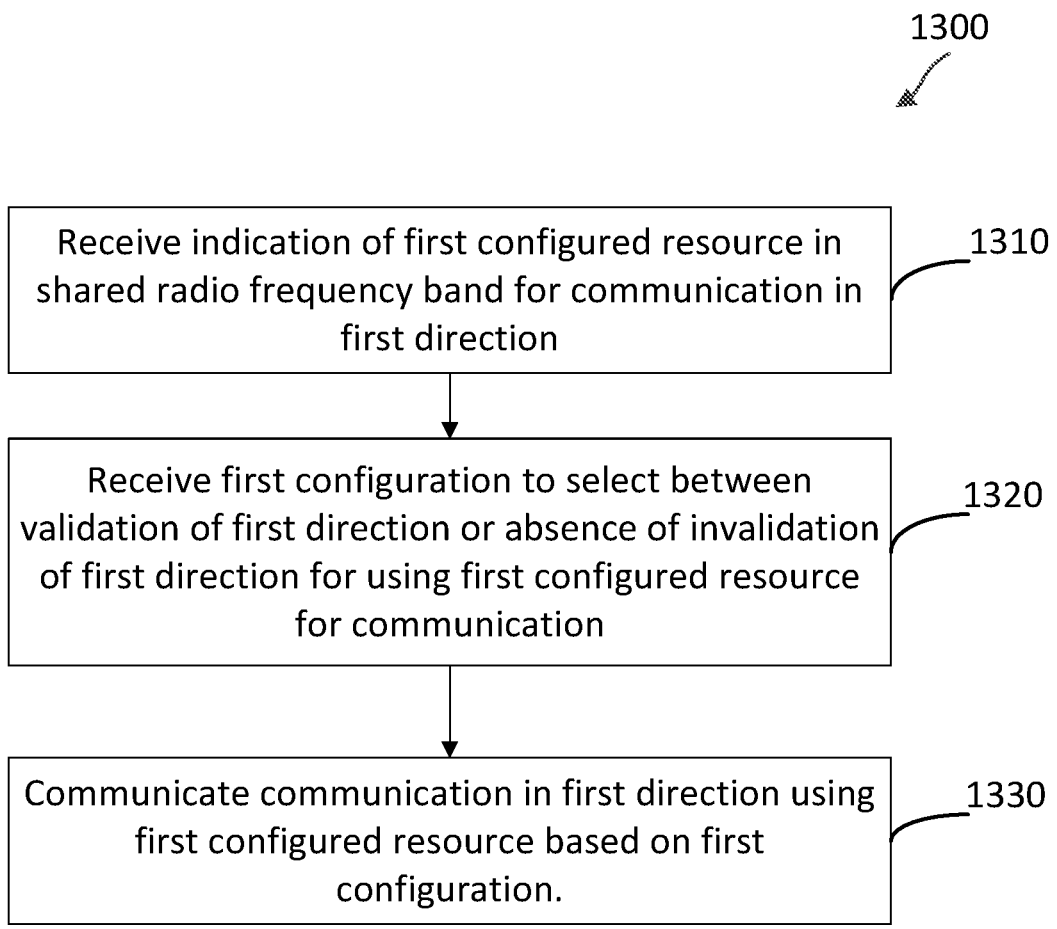
FIG. 13 is a flow diagram of a communication method according to some aspects of the present disclosure.

FIG. 13 is a flow diagram of a communication method 1300 according to some aspects of the present disclosure.

Aspects of the method 1300 can be executed by a computing device (e.g., a processor, processing circuit, and/or other suitable component) of a wireless communication device or other suitable means for performing the steps. For example, a wireless communication device, such as the UE 115 or 500, may utilize one or more components, such as the processor 502, the memory 504, the configured transmission module 507, the transceiver 510, the modem 512, and the one or more antennas 516, to execute the steps of method 1300. The method 1300 may employ similar mechanisms as in the schemes 700, 800, 900, 1100, 1150, 1160, 1200, 1250, 1260, 1270, and/or 1280 described above with respect to FIGS. 7, 8, 9, 11A, 11B, 11C, 12A, 12B, 12C, 12D, and/or 12E, respectively and/or the scenario 1000 described above with respect to FIG. 10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a UE (e.g., the UEs 115 and/or 500) receives, from a BS (e.g., the BSs 105 and/or 600), an indication of a first configured resource in a shared radio frequency band for a communication in a first direction. The indication may be similar to the configured grants 310, 410, 710, 810, 910, and/or 1010. The first configured resource may be similar to the configured resources 912, 1210, and 1212. In some instances, the UE may utilize one or more components, such as the processor 502, the configured transmission module 507, the COT indication module 508, the SFI module 509, the transceiver 510, the modem 512, and the one or more antennas 516, to receive the indication of the first configured resource in the shared radio frequency band for the communication in the first direction.

At block 1320, the UE receives, from the BS, a first configuration to select between a validation of the first direction or an absence of an invalidation of the first direction for using the first configured resource for the communication. In some instances, the UE may utilize one or more components, such as the processor 502, the configured transmission module 507, the COT indication module 508, the SFI module 509, the transceiver 510, the modem 512, and the one or more antennas 516, to receive a PDSCH signal including the first configuration to select between the validation of the first direction or the absence of an invalidation of the first direction for using the first configured resource for the communication. In some instances, the UE may store the configuration, a first set of instruction codes for the validation, a second set of instruction codes for the invalidation in the memory 504. The UE may utilize the processor 502 to execute the first set of instruction codes for the validation or the second set of instruction codes for the invalidation based on the configuration.

At block 1330, the UE communicates, with the BS, the communication in the first direction using the first configured resource based on the first configuration. In some instances, the UE may utilize one or more components, such as the processor 502, the configured transmission module 507, the COT indication module 508, the SFI module 509, the transceiver 510, the modem 512, and the one or more antennas 516, to communicate the communication in the first direction using the first configured resource based on the first configuration.

In some instances, the UE further receives, from the BS, an SFI (e.g., the SFIs 320, 420, 720, 820, 1020, and/or 1220) indicating the first direction for the first configured resource, where the communication is communicated in response to the received SFI validating the first direction for the first configured resource. In some instances, the UE may utilize one or more components, such as the processor 502, the SFI module 509, the transceiver 510, the modem 512, and the one or more antennas 516, to receive the SFI.

In some instances, the UE further monitors, by the UE from the BS, for an SFI for the first configured resource, where the communication is communicated in response to determining, from the monitoring, that no SFI is detected to invalidate the first direction for the first configured resource. In some instances, the UE may utilize one or more components, such as the processor 502, the SFI module 509, the transceiver 510, the modem 512, and the one or more antennas 516, to monitor for the SFI. For instance, the UE may utilize the transceiver 510 to receive a signal form the channel and utilize the processor 502 to decode an SFI from the received signal according to a SFI monitoring occasion (e.g., a time and frequency resource).

In some instances, the first configuration further indicates selecting the validation of the first direction when the first configured resource is within a COT (e.g., the COTs 408, 908, 1208) of the BS and selecting the absence of the invalidation of the first direction when the first configured resource is outside a COT of the BS. In some instances, the first configured resource is within the COT of the BS. In some instances, the first configured resource is outside the COT of the BS. In some instances, the UE further receives, from the BS, downlink control information including an indication of the COT and an SFI indicating a second direction for the first configured resource. In some instances, the UE may utilize one or more components, such as the processor 502, the COT indication module 508, the configured transmission module 507, the SFI module 509, the transceiver 510, the modem 512, and the one or more antennas 516, to receive the downlink control information.

In some instances, the first configuration further indicates selecting between the validation of the first direction and the absence of the invalidation of the first direction based on a frequency carrier associated with the communication. The first configuration further indicates selecting the validation of the first direction when the frequency carrier associated with the communication is at a mmWave frequency and selecting the absence of the invalidation of the first direction when the frequency carrier associated with the communication is at a non-mmWave frequency.

In some instances, the first configuration further indicates selecting between the validation of the first direction and the absence of the invalidation of the first direction based on a contention mode associated with the communication. In some instances, the first configuration further indicates selecting the validation of the first direction when the contention mode associated with the communication is a FBE contention mode and selecting the absence of the invalidation of the first direction when the contention mode associated with the communication is a LBE contention mode.

In some instances, the UE further receives, from the BS, an indication of a second configured resource in the shared radio frequency band for a communication in a second direction. In some instances, the UE may utilize one or more components, such as the processor 502, the COT indication module 508, the configured transmission module 507, the SFI module 509, the transceiver 510, the modem 512, and the one or more antennas 516, to receive the indication of the second configured resource. In some instances, the UE further receives, from the BS, a second configuration to select between a validation of the second direction and an absence of an invalidation of the second direction for using the second configured resource for the communication, the second configuration being different from the first configuration. In some instances, the UE may utilize one or more components, such as the processor 502, the COT indication module 508, the configured transmission module 507, the SFI module 509, the transceiver 510, the modem 512, and the one or more antennas 516, to receive the second configuration.

In some instances, the UE further receives, from the BS, an indication of a second configured resource in the shared radio frequency band for a communication in a second direction, where the first configuration further indicates to select between a validation of the second direction and an absence of an invalidation of the second direction for using the second configured resource for the communication. In some instances, the UE may utilize one or more components, such as the processor 502, the COT indication module 508, the configured transmission module 507, the SFI module 509, the transceiver 510, the modem 512, and the one or more antennas 516, to receive the indication of the second configured resource.

In some instance, the UE further receives, from the BS, an indication of a second configured resource for communication in an uplink direction, the second configured resource being outside of a channel occupancy time (COT) of the BS. The UE further receives, from the BS, an SFI indicating a non-uplink direction for the second configured resource. The UE further refrains from transmitting in the second configured resource based on the received SFI indicating the non-uplink direction for the second configured resource. In some instances, the UE may utilize one or more components, such as the processor 502, the COT indication module 508, the configured transmission module 507, the SFI module 509, the transceiver 510, the modem 512, and the one or more antennas 516, to receive the indication of the second configured resource and the SFI the UE may utilize one or more components, such as the processor 502, to refrain from transmitting by removing a configured transmission from a transmission queue in the memory 504.

In some instances, at the block 1320, the UE further receives, from the BS, the first configuration via RRC signaling.

In some instances, the UE further receives, from the BS, an indication of a second configured resource for a second communication in a second direction. The UE further receives, from the BS, an indication for a COT without a SFI for the COT, where the second configured resource is within the COT. The UE further communicates, with the BS, the second communication in the second direction using the second configured resource based on the received indication for the COT.

Figure 14:
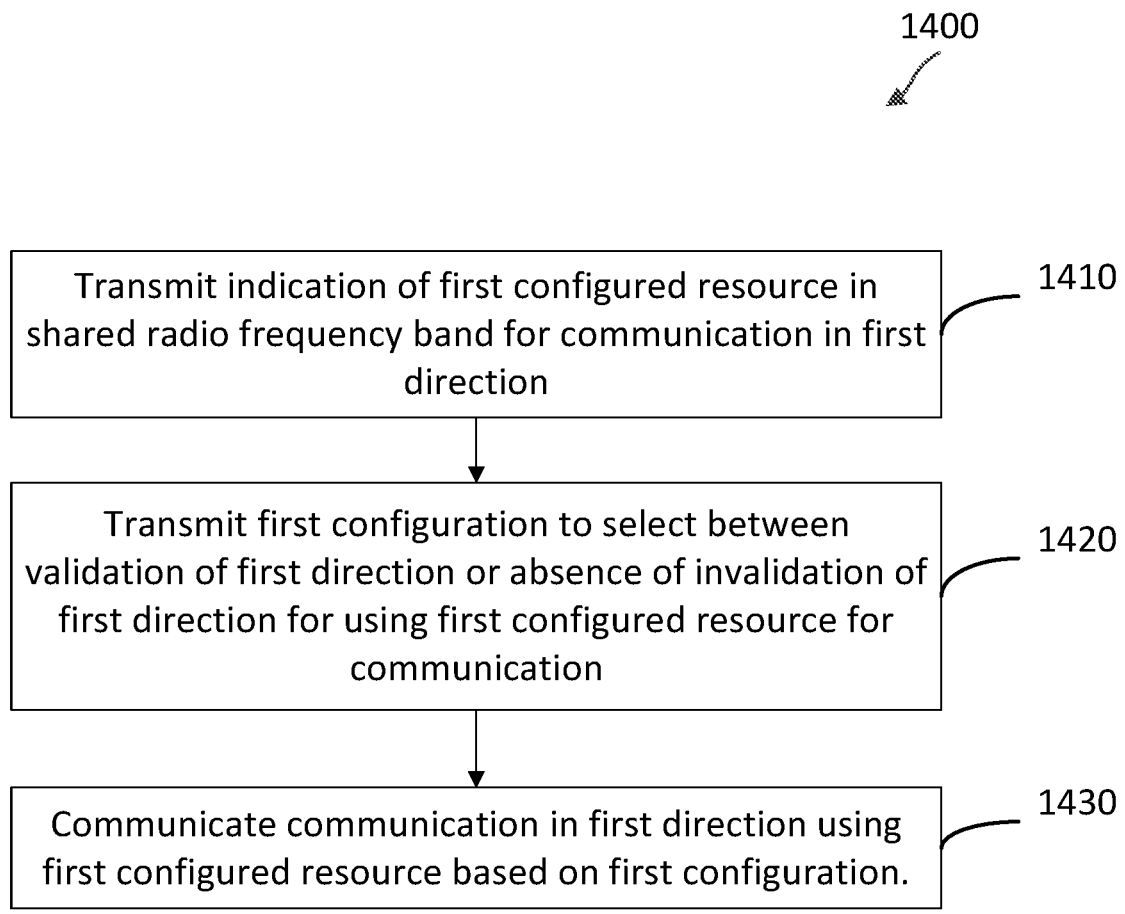
FIG. 14 is a flow diagram of a communication method according to some aspects of the present disclosure.

FIG. 14 is a flow diagram of a communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the BS 105 or 600, may utilize one or more components, such as the processor 602, the memory 604, the configured transmission module 607, COT indication module 608, the SFI module 609, the transceiver 610, the modem 612, and the one or more antennas 616, to execute the steps of method 1300. The method 1300 may employ similar mechanisms as in the schemes 700, 800, 900, 1100, 1150, 1160, 1200, 1250, 1260, 1270, and/or 1280 described above with respect to FIGS. 7, 8, 9, 11A, 11B, 11C, 12A, 12B, 12C, 12D, and/or 12E, respectively and/or the scenario 1000 described above with respect to FIG. 10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1410, a BS (e.g., the BSs 105 and/or 600) transmits, to a UE (e.g., the UEs 115 and/or 500), an indication of a first configured resource in a shared radio frequency band for a communication in a first direction. The indication may be similar to the configured grants 310, 410, 710, 810, 910, and/or 1010. The first configured resource may be similar to the configured resources 912, 1210, and 1212. In some instances, the BS may utilize one or more components, such as the processor 602, the configured transmission module 607, the COT indication module 608, the SFI module 609, the transceiver 610, the modem 612, and the one or more antennas 616, to transmit the indication of the first configured resource in the shared radio frequency band for the communication in the first direction.

At block 1420, the BS transmits, to the UE, a first configuration to select between a validation of the first direction or an absence of an invalidation of the first direction for using the first configured resource for the communication. In some instances, the BS may utilize one or more components, such as the processor 602, the configured transmission module 607, the COT indication module 608, the SFI module 609, the transceiver 610, the modem 612, and the one or more antennas 616, to transmit the first configuration to select between the validation of the first direction or the absence of an invalidation of the first direction for using the first configured resource for the communication.

At block 1430, the BS communicates, with the UE, the communication in the first direction using the first configured resource based on the first configuration. In some instances, the BS may utilize one or more components, such as the processor 602, the configured transmission module 607, the COT indication module 608, the SFI module 609, the transceiver 610, the modem 612, and the one or more antennas 616, to transmit the first configuration to communicate the communication in the first direction using the first configured resource based on the first configuration.

In some instances, the BS further transmits, to the UE, an SFI indicating the first direction for the first configured resource, where the communication is communicated in response to the transmitted SFI validating the first direction for the first configured resource. In some instances, the BS may utilize one or more components, such as the processor 602, the configured transmission module 607, the COT indication module 608, the SFI module 609, the transceiver 610, the modem 612, and the one or more antennas 616, to transmit the SFI.

In some instances, the first configuration further indicates selecting the validation of the first direction when the first configured resource is within a COT of the BS and selecting the absence of the invalidation of the first direction when the first configured resource is outside a COT of the BS. In some instances, the first configured resource is within the COT of the BS. In some instances, the first configured resource is outside the COT of the BS. In some instances, the BS transmits, to the UE, downlink control information including an indication of the COT and an SFI indicating a second direction for the first configured resource. In some instances, the BS may utilize one or more components, such as the processor 602, the configured transmission module 607, the COT indication module 608, the SFI module 609, the transceiver 610, the modem 612, and the one or more antennas 616, to receive the downlink control information.

In some instances, the first configuration further indicates selecting between the validation of the first direction and the absence of the invalidation of the first direction based on a frequency carrier associated with the communication. In some instances, the first configuration further indicates selecting the validation of the first direction when the frequency carrier associated with the communication is at a mmWave frequency and selecting the absence of the invalidation of the first direction when the frequency carrier associated with the communication is at a non-mmWave frequency.

In some instances, the first configuration further indicates selecting between the validation of the first direction and the absence of the invalidation of the first direction based on a contention mode associated with the communication. In some instances, the first configuration further indicates selecting the validation of the first direction when the contention mode associated with the communication is a FBE contention mode and selecting the absence of the invalidation of the first direction when the contention mode associated with the communication is a LBE contention mode.

In some instances, the BS further transmits, to the UE, an indication of a second configured resource in the shared radio frequency band for a communication in a second direction. The BS further transmits, to the UE, a second configuration to select between a validation of the second direction and an absence of an invalidation of the second direction for using the second configured resource for the communication, the second configuration being different to the first configuration. In some instances, the BS may utilize one or more components, such as the processor 602, the configured transmission module 607, the COT indication module 608, the SFI module 609, the transceiver 610, the modem 612, and the one or more antennas 616, to transmit the indication of the second resource and the second configuration.

In some instances, the BS further transmits, to the UE, an indication of a second configured resource in the shared radio frequency band for a communication in a second direction, where the first configuration further indicates to select between a validation of the second direction and an absence of an invalidation of the second direction for using the second configured resource for the communication. In some instances, the BS may utilize one or more components, such as the processor 602, the configured transmission module 607, the COT indication module 608, the SFI module 609, the transceiver 610, the modem 612, and the one or more antennas 616, to transmit the indication of the second configured resource.

In some instances, the BS further transmits, to the UE, an indication of a second configured resource for a communication in an uplink direction, the second configured resource being outside of a COT of the BS. The BS further transmits, to the UE, a slot format indicator (SFI) indicating a non-uplink direction for the second configured resource to cancel the communication for the second configured resource.

In some instances, at the block 1420, the BS further transmits, to the UE, the first configuration via RRC signaling.

In some instances, the BS further transmits, to another UE, an indication of a second configured resource for a communication in a second direction. The BS further transmits, to the UE, a downlink communication during a COT of the UE. The BS further transmits, to the another UE, an indication to cancel the communication for the second configured resource based on a determination that the second configured resource is within the COT of the UE. In some instances, the BS may utilize one or more components, such as the processor 602, the configured transmission module 607, the COT indication module 608, the SFI module 609, the transceiver 610, the modem 612, and the one or more antennas 616, to transmit, to the another UE, the indication of the second configured resource and the cancelling of the communication for the second configured resource. In some instances, the transmitting the indication to cancel the communication for the second configured resource includes transmitting an SFI indicating a third direction (e.g., a flexible direction) for the second configured resource different from the second direction.

In some instances, the BS further transmits, to the UE, an indication of a second configured resource for a second communication in a second direction. The BS further transmits, to the UE, an indication for a COT without an SFI for the COT, where the second configured resource is within the COT. The BS further communicates, with the UE, the second communication in the second direction using the second configured resource. In some instances, the BS may utilize one or more components, such as the processor 602, the configured transmission module 607, the COT indication module 608, the SFI module 609, the transceiver 610, the modem 612, and the one or more antennas 616, to transmit the indication of the second configured resource and the indication for the COT without the SFI for the COT and communicate the second communication.

Further embodiments of the present disclosure include a user equipment (UE). The UE includes a transceiver configured to receive, from a base station (BS), an indication of a first configured resource in a shared radio frequency band for a communication in a first direction; receive, from the BS, a first configuration to select between a validation of the first direction or an absence of an invalidation of the first direction for using the first configured resource for the communication; and communicate, with the BS, the communication in the first direction using the first configured resource based on the first configuration.

The UE may also include one or more of the following features. For instance, the UE includes where the transceiver is further configured to receive, from the BS, a slot format indicator (SFI) indicating the first direction for the first configured resource and the transceiver configured to communicate the communication is configured to communicate, with the BS, the communication in response to the received SFI validating the first direction for the first configured resource. The UE may include a processor configured to monitor, from the BS, for a slot format indicator (SFI) for the first configured resource, the transceiver configured to communicate the communication is configured to communicate, with the BS, the communication is in response to determining, from the monitoring, that no SFI is detected to invalidate the first direction for the first configured resource. The first configuration further indicates selecting the validation of the first direction when the first configured resource is within a channel occupancy time (COT) of the BS; and selecting the absence of the invalidation of the first direction when the first configured resource is outside a COT of the BS. The first configured resource is within the COT of the BS. The first configured resource is outside the COT of the BS. The transceiver is further configured to receive, from the BS, downlink control information including an indication of the COT and a slot format indicator (SFI) indicating a second direction for the first configured resource. The first configuration further indicates selecting between the validation of the first direction and the absence of the invalidation of the first direction based on a frequency carrier associated with the communication. The first configuration further indicates selecting the validation of the first direction when the frequency carrier associated with the communication is at a millimeter wave (mmWave) frequency; and selecting the absence of the invalidation of the first direction when the frequency carrier associated with the communication is at a non-mmWave frequency. The first configuration further indicates selecting between the validation of the first direction and the absence of the invalidation of the first direction based on a contention mode associated with the communication. The first configuration further indicates selecting the validation of the first direction when the contention mode associated with the communication is a frame-based-equipment (FBE) contention mode; and selecting the absence of the invalidation of the first direction when the contention mode associated with the communication is a load-based-equipment (LBE) contention mode. The transceiver is further configured to receive, from the BS, an indication of a second configured resource in the shared radio frequency band for a communication in a second direction; and receive, from the BS, a second configuration to select between a validation of the second direction and an absence of an invalidation of the second direction for using the second configured resource for the communication, the second configuration being different from the first configuration. The transceiver is further configured to receive, from the BS, an indication of a second configured resource in the shared radio frequency band for a communication in a second direction; and the first configuration further indicates to select between a validation of the second direction and an absence of an invalidation of the second direction for using the second configured resource for the communication. The transceiver is further configured to receive, from the BS, an indication of a second configured resource for communication in an uplink direction, the second configured resource being outside of a channel occupancy time (COT) of the BS; and receive, from the BS, a slot format indicator (SFI) indicating a non-uplink direction for the second configured resource; and the UE further includes a processor configured to refrain, from transmit in the second configured resource based on the received SFI indicating the non-uplink direction for the second configured resource. The transceiver configured to receive the first configuration is configured to receive, from the BS, the first configuration via radio resource control (RRC) signaling. The transceiver is further configured to receive, from the BS, an indication of a second configured resource for a second communication in a second direction; receive, from the BS, an indication for a channel occupancy time (COT) without a slot format indication (SFI) for the COT, the second configured resource within the COT; and communicate, with the BS, the second communication in the second direction using the second configured resource based on the received indication for the COT.

Further embodiments of the present disclosure include a base station (BS). The BS includes a transceiver configured to transmit, to a user equipment (UE), an indication of a first configured resource in a shared radio frequency band for a communication in a first direction; transmit, to the UE, a first configuration to select between a validation of the first direction or an absence of an invalidation of the first direction for using the first configured resource for the communication; and communicate, with the UE, the communication in the first direction using the first configured resource based on the first configuration.

The BS may also include one or more of the following features. For instance, the BS includes where the transceiver is further configured to transmit, to the UE, a slot format indicator (SFI) indicating the first direction for the first configured resource, the transceiver configured to communicate the communication is configured to communicate, with the UE, the communication is in response to the transmitted SFI validating the first direction for the first configured resource. The first configuration further indicates selecting the validation of the first direction when the first configured resource is within a channel occupancy time (COT) of the BS; and selecting the absence of the invalidation of the first direction when the first configured resource is outside a COT of the BS. The first configured resource is within the COT of the BS. The first configured resource is outside the COT of the BS. The transceiver is further configured to transmit, to the UE, downlink control information including an indication of the COT and a slot format indicator (SFI) indicating a second direction for the first configured resource. The first configuration further indicates selecting between the validation of the first direction and the absence of the invalidation of the first direction based on a frequency carrier associated with the communication. The first configuration further indicates selecting the validation of the first direction when the frequency carrier associated with the communication is at a millimeter wave (mmWave) frequency; and selecting the absence of the invalidation of the first direction when the frequency carrier associated with the communication is at a non-mmWave frequency. The first configuration further indicates selecting between the validation of the first direction and the absence of the invalidation of the first direction based on a contention mode associated with the communication. The first configuration further indicates selecting the validation of the first direction when the contention mode associated with the communication is a frame-based-equipment (FBE) contention mode; and selecting the absence of the invalidation of the first direction when the contention mode associated with the communication is a load-based-equipment (LBE) contention mode. The transceiver is further configured to transmit, to the UE, an indication of a second configured resource in the shared radio frequency band for a communication in a second direction; and transmit, to the UE, a second configuration to select between a validation of the second direction and an absence of an invalidation of the second direction for using the second configured resource for the communication, the second configuration being different to the first configuration. The transceiver is further configured to transmit, to the UE, an indication of a second configured resource in the shared radio frequency band for a communication in a second direction; and the first configuration further indicates to select between a validation of the second direction and an absence of an invalidation of the second direction for using the second configured resource for the communication. The transceiver is further configured to transmit, to the UE, an indication of a second configured resource for a communication in an uplink direction, the second configured resource being outside of a channel occupancy time (COT) of the BS; and transmit, to the UE, a slot format indicator (SFI) indicating a non-uplink direction for the second configured resource to cancel the communication for the second configured resource. The transceiver configured to transmit the first configuration is configured to transmit, to the UE, the first configuration via radio resource control (RRC) signaling. The transceiver is further configured to transmit, to another UE, an indication of a second configured resource for a communication in a second direction; transmit, to the UE, a downlink communication during a channel occupancy time (COT) of the UE; and transmit, to the another UE, an indication to cancel the communication for the second configured resource based on a determination that the second configured resource is within the COT of the UE. The transceiver configured to transmit the indication to cancel the communication for the second configured resource is configured to transmit, to the another UE, a slot format indicator (SFI) indicating a third direction for the second configured resource different from the second direction. The transceiver is further configured to transmit, to the UE, an indication of a second configured resource for a second communication in a second direction; transmit, to the UE, an indication for a channel occupancy time (COT) without a slot format indication (SFI) for the COT, the second configured resource within the COT; and communicate, with the UE, the second communication in the second direction using the second configured resource.

Further embodiments of the present disclosure include a non-transitory computer-readable medium having program code recorded thereon. The non-transitory computer-readable medium includes code for causing a user equipment (UE) to receive, from a base station (BS), an indication of a first configured resource in a shared radio frequency band for a communication in a first direction. The non-transitory computer-readable medium also includes code for causing the UE to receive, from the BS, a first configuration to select between a validation of the first direction or an absence of an invalidation of the first direction for using the first configured resource for the communication. The non-transitory computer-readable medium also includes code for causing the UE to communicate, with the BS, the communication in the first direction using the first configured resource based on the first configuration.

The non-transitory computer-readable may also include one or more of the following features. For instance, the non-transitory computer-readable medium includes code for causing the UE to receive, from the BS, a slot format indicator (SFI) indicating the first direction for the first configured resource, where the code for causing the UE to communicate the communication is configured to communicate, with the BS, the communication in response to the received SFI validating the first direction for the first configured resource. The code for causing the UE to communicate the communication is configured to communicate, with the BS, the communication is in response to determining, from the monitoring, that no SFI is detected to invalidate the first direction for the first configured resource. The first configuration further indicates selecting the validation of the first direction when the first configured resource is within a channel occupancy time (COT) of the BS; and selecting the absence of the invalidation of the first direction when the first configured resource is outside a COT of the BS. The first configured resource is within the COT of the BS. The first configured resource is outside the COT of the BS. The non-transitory computer-readable medium may include code for causing the UE to receive, from the BS, downlink control information including an indication of the COT and a slot format indicator (SFI) indicating a second direction for the first configured resource. The first configuration further indicates selecting between the validation of the first direction and the absence of the invalidation of the first direction based on a frequency carrier associated with the communication. The first configuration further indicates selecting the validation of the first direction when the frequency carrier associated with the communication is at a millimeter wave (mmWave) frequency; and selecting the absence of the invalidation of the first direction when the frequency carrier associated with the communication is at a non-mmWave frequency. The first configuration further indicates selecting between the validation of the first direction and the absence of the invalidation of the first direction based on a contention mode associated with the communication. The first configuration further indicates selecting the validation of the first direction when the contention mode associated with the communication is a frame-based-equipment (FBE) contention mode; and selecting the absence of the invalidation of the first direction when the contention mode associated with the communication is a load-based-equipment (LBE) contention mode. The non-transitory computer-readable medium may include code for causing the UE to receive, from the BS, an indication of a second configured resource in the shared radio frequency band for a communication in a second direction; and code for causing the UE to receive, from the BS, a second configuration to select between a validation of the second direction and an absence of an invalidation of the second direction for using the second configured resource for the communication, the second configuration being different from the first configuration. The first configuration further indicates to select between a validation of the second direction and an absence of an invalidation of the second direction for using the second configured resource for the communication. The non-transitory computer-readable medium may include code for causing the UE to receive, from the BS, an indication of a second configured resource for communication in an uplink direction, the second configured resource being outside of a channel occupancy time (COT) of the BS; code for causing the UE to receive, from the BS, a slot format indicator (SFI) indicating a non-uplink direction for the second configured resource; and code for causing the UE to refrain, from transmit in the second configured resource based on the received SFI indicating the non-uplink direction for the second configured resource. The code for causing the UE to receive the first configuration is configured to receive, from the BS, the first configuration via radio resource control (RRC) signaling. The non-transitory computer-readable medium may include code for causing the UE to receive, from the BS, an indication of a second configured resource for a second communication in a second direction; code for causing the UE to receive, from the BS, an indication for a channel occupancy time (COT) without a slot format indication (SFI) for the COT, the second configured resource within the COT; and code for causing the UE to communicate, with the BS, the second communication in the second direction using the second configured resource based on the received indication for the COT.

Further embodiments of the present disclosure include a non-transitory computer-readable medium having program code recorded thereon. The non-transitory computer-readable medium includes code for causing a base station (BS) to transmit, to a user equipment (UE), an indication of a first configured resource in a shared radio frequency band for a communication in a first direction. The non-transitory computer-readable medium also includes code for causing the BS to transmit, to the UE, a first configuration to select between a validation of the first direction or an absence of an invalidation of the first direction for using the first configured resource for the communication. The non-transitory computer-readable medium also includes code for causing the BS to communicate, with the UE, the communication in the first direction using the first configured resource based on the first configuration.

The non-transitory computer-readable may also include one or more of the following features. For instance, the non-transitory computer-readable medium includes code for causing the BS to transmit, to the UE, a slot format indicator (SFI) indicating the first direction for the first configured resource, where the code for causing the BS to communicate the communication is configured to communicate, with the UE, the communication is in response to the transmitted SFI validating the first direction for the first configured resource. The first configuration further indicates selecting the validation of the first direction when the first configured resource is within a channel occupancy time (COT) of the BS; and selecting the absence of the invalidation of the first direction when the first configured resource is outside a COT of the BS. The first configured resource is within the COT of the BS. The first configured resource is outside the COT of the BS. The non-transitory computer-readable medium may include code for causing the BS to transmit, to the UE, downlink control information including an indication of the COT and a slot format indicator (SFI) indicating a second direction for the first configured resource. The first configuration further indicates selecting between the validation of the first direction and the absence of the invalidation of the first direction based on a frequency carrier associated with the communication. The first configuration further indicates selecting the validation of the first direction when the frequency carrier associated with the communication is at a millimeter wave (mmWave) frequency; and selecting the absence of the invalidation of the first direction when the frequency carrier associated with the communication is at a non-mmWave frequency. The first configuration further indicates selecting between the validation of the first direction and the absence of the invalidation of the first direction based on a contention mode associated with the communication. The first configuration further indicates selecting the validation of the first direction when the contention mode associated with the communication is a frame-based-equipment (FBE) contention mode; and selecting the absence of the invalidation of the first direction when the contention mode associated with the communication is a load-based-equipment (LBE) contention mode. The non-transitory computer-readable medium may include code for causing the BS to transmit, to the UE, an indication of a second configured resource in the shared radio frequency band for a communication in a second direction; and code for causing the BS to transmit, to the UE, a second configuration to select between a validation of the second direction and an absence of an invalidation of the second direction for using the second configured resource for the communication, the second configuration being different to the first configuration. The first configuration further indicates to select between a validation of the second direction and an absence of an invalidation of the second direction for using the second configured resource for the communication. The non-transitory computer-readable medium may include code for causing the BS to transmit, to the UE, an indication of a second configured resource for a communication in an uplink direction, the second configured resource being outside of a channel occupancy time (COT) of the BS; and code for causing the BS to transmit, to the UE, a slot format indicator (SFI) indicating a non-uplink direction for the second configured resource to cancel the communication for the second configured resource. The code for causing the BS to transmit the first configuration is configured to transmit, to the UE, the first configuration via radio resource control (RRC) signaling. The non-transitory computer-readable medium may include code for causing the BS to transmit, to another UE, an indication of a second configured resource for a communication in a second direction; code for causing the BS to transmit, to the UE, a downlink communication during a channel occupancy time (COT) of the UE; and code for causing the BS to transmit, to the another UE, an indication to cancel the communication for the second configured resource based on a determination that the second configured resource is within the COT of the UE. The code for causing the BS to transmit the indication to cancel the communication for the second configured resource is configured to transmit, to the another UE, a slot format indicator (SFI) indicating a third direction for the second configured resource different from the second direction. The non-transitory computer-readable medium may include code for causing the BS to transmit, to the UE, an indication of a second configured resource for a second communication in a second direction; code for causing the BS to transmit, to the UE, an indication for a channel occupancy time (COT) without a slot format indication (SFI) for the COT, the second configured resource within the COT; and code for causing the BS to communicate, with the UE, the second communication in the second direction using the second configured resource.

Further embodiments of the present disclosure include a user equipment (UE). The user equipment includes means for receiving, from a base station (BS), an indication of a first configured resource in a shared radio frequency band for a communication in a first direction. The user equipment also includes means for receiving, from the BS, a first configuration to select between a validation of the first direction or an absence of an invalidation of the first direction for using the first configured resource for the communication. The user equipment also includes means for communicating, with the BS, the communication in the first direction using the first configured resource based on the first configuration.

The UE may also include one or more of the following features. For instance, the UE includes means for receiving, from the BS, a slot format indicator (SFI) indicating the first direction for the first configured resource, where the means for communicating the communication is configured to communicate, with the BS, the communication in response to the received SFI validating the first direction for the first configured resource. The means for communicating the communication is configured to communicate, with the BS, the communication is in response to determining, from the monitoring, that no SFI is detected to invalidate the first direction for the first configured resource. The first configuration further indicates selecting the validation of the first direction when the first configured resource is within a channel occupancy time (COT) of the BS; and selecting the absence of the invalidation of the first direction when the first configured resource is outside a COT of the BS. The first configured resource is within the COT of the BS. The first configured resource is outside the COT of the BS. The UE may include means for receiving, from the BS, downlink control information including an indication of the COT and a slot format indicator (SFI) indicating a second direction for the first configured resource. The first configuration further indicates selecting between the validation of the first direction and the absence of the invalidation of the first direction based on a frequency carrier associated with the communication. The first configuration further indicates selecting the validation of the first direction when the frequency carrier associated with the communication is at a millimeter wave (mmWave) frequency; and selecting the absence of the invalidation of the first direction when the frequency carrier associated with the communication is at a non-mmWave frequency. The first configuration further indicates selecting between the validation of the first direction and the absence of the invalidation of the first direction based on a contention mode associated with the communication. The first configuration further indicates selecting the validation of the first direction when the contention mode associated with the communication is a frame-based-equipment (FBE) contention mode; and selecting the absence of the invalidation of the first direction when the contention mode associated with the communication is a load-based-equipment (LBE) contention mode. The UE may include means for receiving, from the BS, an indication of a second configured resource in the shared radio frequency band for a communication in a second direction; and means for receiving, from the BS, a second configuration to select between a validation of the second direction and an absence of an invalidation of the second direction for using the second configured resource for the communication, the second configuration being different from the first configuration. The first configuration further indicates to select between a validation of the second direction and an absence of an invalidation of the second direction for using the second configured resource for the communication. The UE may include means for receiving, from the BS, an indication of a second configured resource for communication in an uplink direction, the second configured resource being outside of a channel occupancy time (COT) of the BS; means for receiving, from the BS, a slot format indicator (SFI) indicating a non-uplink direction for the second configured resource; and means for refrain, from transmit in the second configured resource based on the received SFI indicating the non-uplink direction for the second configured resource. The means for receiving the first configuration is configured to receive, from the BS, the first configuration via radio resource control (RRC) signaling. The UE may include means for receiving, from the BS, an indication of a second configured resource for a second communication in a second direction; means for receiving, from the BS, an indication for a channel occupancy time (COT) without a slot format indication (SFI) for the COT, the second configured resource within the COT; and means for communicating, with the BS, the second communication in the second direction using the second configured resource based on the received indication for the COT.

Further embodiments of the present disclosure include a base station (BS). The base station includes means for transmitting, to a user equipment (UE), an indication of a first configured resource in a shared radio frequency band for a communication in a first direction. The base station also includes means for transmitting, to the UE, a first configuration to select between a validation of the first direction or an absence of an invalidation of the first direction for using the first configured resource for the communication. The base station also includes means for communicating, with the UE, the communication in the first direction using the first configured resource based on the first configuration.

The BS may also include one or more of the following features. For instance, the BS includes means for transmitting, to the UE, a slot format indicator (SFI) indicating the first direction for the first configured resource, where the means for communicating the communication is configured to communicate, with the UE, the communication is in response to the transmitted SFI validating the first direction for the first configured resource. The first configuration further indicates selecting the validation of the first direction when the first configured resource is within a channel occupancy time (COT) of the BS; and selecting the absence of the invalidation of the first direction when the first configured resource is outside a COT of the BS. The first configured resource is within the COT of the BS. The first configured resource is outside the COT of the BS. The BS may include means for transmitting, to the UE, downlink control information including an indication of the COT and a slot format indicator (SFI) indicating a second direction for the first configured resource. The first configuration further indicates selecting between the validation of the first direction and the absence of the invalidation of the first direction based on a frequency carrier associated with the communication. The first configuration further indicates selecting the validation of the first direction when the frequency carrier associated with the communication is at a millimeter wave (mmWave) frequency; and selecting the absence of the invalidation of the first direction when the frequency carrier associated with the communication is at a non-mmWave frequency. The first configuration further indicates selecting between the validation of the first direction and the absence of the invalidation of the first direction based on a contention mode associated with the communication. The first configuration further indicates selecting the validation of the first direction when the contention mode associated with the communication is a frame-based-equipment (FBE) contention mode; and selecting the absence of the invalidation of the first direction when the contention mode associated with the communication is a load-based-equipment (LBE) contention mode. The BS may include means for transmitting, to the UE, an indication of a second configured resource in the shared radio frequency band for a communication in a second direction; and means for transmitting, to the UE, a second configuration to select between a validation of the second direction and an absence of an invalidation of the second direction for using the second configured resource for the communication, the second configuration being different to the first configuration. The first configuration further indicates to select between a validation of the second direction and an absence of an invalidation of the second direction for using the second configured resource for the communication. The BS may include means for transmitting, to the UE, an indication of a second configured resource for a communication in an uplink direction, the second configured resource being outside of a channel occupancy time (COT) of the BS; and means for transmitting, to the UE, a slot format indicator (SFI) indicating a non-uplink direction for the second configured resource to cancel the communication for the second configured resource. The means for transmitting the first configuration is configured to transmit, to the UE, the first configuration via radio resource control (RRC) signaling. The BS may include means for transmitting, to another UE, an indication of a second configured resource for a communication in a second direction; means for transmitting, to the UE, a downlink communication during a channel occupancy time (COT) of the UE; and means for transmitting, to the another UE, an indication to cancel the communication for the second configured resource based on a determination that the second configured resource is within the COT of the UE. The means for transmitting the indication to cancel the communication for the second configured resource is configured to transmit, to the another UE, a slot format indicator (SFI) indicating a third direction for the second configured resource different from the second direction. The BS may include means for transmitting, to the UE, an indication of a second configured resource for a second communication in a second direction; means for transmitting, to the UE, an indication for a channel occupancy time (COT) without a slot format indication (SFI) for the COT, the second configured resource within the COT; and means for communicating, with the UE, the second communication in the second direction using the second configured resource.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE), from a base station (BS), an indication of a first configured resource in a shared radio frequency band for a communication in a first direction;
   receiving, by the UE from the BS, a first rule to select between a validation of the first direction, or an absence of an invalidation of the first direction, for using the first configured resource for the communication, wherein for the invalidation the UE assumes that the first configured resource is valid unless the UE receives a direction indication for a symbol in the first configured resource;
   monitoring for a slot format indicator (SFI) for the first configured resource; and
   communicating, by the UE with the B S in response to determining from the monitoring that no SFI is detected to invalidate the first direction for the first configured resource, the communication in the first direction using the first configured resource based on the first rule.

2. The method of claim 1, further comprising:
   receiving, by indication from the B S from the monitoring, SFI for the first configured resource,
   wherein the communicating the communication is in response to the received SFI validating the first direction for the first configured resource.

3. The method of claim 1,
   wherein the UE is configured by the B S to monitor for the SFI with monitoring occasions, in particular time resources and frequency resources.

4. The method of claim 1, wherein the first rule further indicates:
   selecting the validation of the first direction when the first configured resource is within a channel occupancy time (COT) of the BS; and
   selecting the absence of the invalidation of the first direction when the first configured resource is outside a COT of the BS.

5. The method of claim 4, further comprising:
   receiving, by the UE from the BS, downlink control information including an indication of the COT and a slot format indicator (SFI) indicating a second direction for the first configured resource.

6. The method of claim 1, wherein the first rule configuration further indicates:
   selecting the validation of the first direction when the communication is over a millimeter wave (mmWave) frequency; and
   selecting the absence of the invalidation of the first direction when the communication is over a non-mmWave frequency.

7. The method of claim 1, wherein the first rule further indicates:
   selecting the validation of the first direction when the communication is associated with a frame-based-equipment (FBE) contention mode; and
   selecting the absence of the invalidation of the first direction when the communication is associated with a load-based-equipment (LBE) contention mode.

8. The method of claim 1, further comprising:
   receiving, by the UE from the B S, an indication of a second configured resource in the shared radio frequency band for a communication in a second direction; and
   receiving, by the UE from the BS, a second rule to select between a validation of the second direction and an absence of an invalidation of the second direction for using the second configured resource for the communication, the second rule being different from the first rule.

9. The method of claim 1, further comprising:
receiving, by the UE from the BS, an indication of a second configured resource in the shared radio frequency band for a communication in a second direction,
wherein the first rule further indicates to select between a validation of the second direction and an absence of an invalidation of the second direction for using the second configured resource for the communication.

10. The method of claim 1, wherein the receiving the first rule includes:
receiving, by the UE from the BS, the first rule via radio resource control (RRC) signaling.

11. The method of claim 1, further comprising:
receiving, by the UE from the B S, an indication of a second configured resource for a second communication in a second direction;
receiving, by the UE from the BS, an indication for a channel occupancy time (COT) without a slot format indication (SFI) for the COT, the second configured resource within the COT; and
communicating, by the UE with the BS, the second communication in the second direction using the second configured resource based on the received indication for the COT.

12. A method of wireless communication, comprising:
transmitting, by a base station (BS), to a user equipment (UE), an indication of a first configured resource in a shared radio frequency band for a communication in a first direction;
transmitting, by the BS to the UE, a first rule to select between a validation of the first direction or an absence of an invalidation of the first direction for using the first configured resource for the communication, wherein for the validation the UE assumes that the first configured resource is invalid until the UE receives a direction indication for each symbol in the first configured resource and for the invalidation the UE assumes that the first configured resource is valid unless the UE receives a direction indication for a symbol in the first configured resource and wherein a slot format indicator (SFI) validates or invalidates the first direction;
the first rule indicates:
selecting the validation of the first direction when the first configured resource is within a channel occupancy time (COT) of the BS; and
selecting the absence of the invalidation of the first direction when the first configured resource is outside a COT of the BS; and
communicating, by the BS with the UE, the communication in the first direction using the first configured resource based on the first rule;
transmitting, by the BS to another UE, an indication of a second configured resource for a communication in a second direction;
transmitting, by the BS to the UE, a downlink communication during a channel occupancy time, COT, of the UE; and
transmitting, by the BS to the another UE, an indication to cancel the communication for the second configured resource based on a determination that the second configured resource is within the COT of the UE, wherein the transmitting the indication to cancel the communication for the second configured resource includes transmitting, by the BS to the another UE, a slot format indicator (SFI) indicating a third direction for the second configured resource different from the second direction.

13. The method of claim 12, further comprising:
transmitting, by the BS to the UE, a slot format indicator (SFI) indicating the first direction for the first configured resource,
wherein the communicating the communication is in response to the transmitted SFI validating the first direction for the first configured resource.

14. The method of claim 12, further comprising:
transmitting, by the BS to the UE, downlink control information including an indication of the COT and a slot format indicator (SFI) indicating a second direction for the first configured resource.

15. The method of claim 12, wherein the first rule further indicates:
selecting the validation of the first direction when the communication is over a millimeter wave (mmWave) frequency; and
selecting the absence of the invalidation of the first direction when the communication is over a non-mmWave frequency.

16. The method of claim 12, wherein the first rule further indicates:
selecting the validation of the first direction when the communication is associated with a frame-based-equipment (FBE) contention mode; and
selecting the absence of the invalidation of the first direction when the communication is associated with a load-based-equipment (LBE) contention mode.

17. The method of claim 12, further comprising:
transmitting, by the BS to the UE, an indication of a second configured resource in the shared radio frequency band for a communication in a second direction; and
transmitting, by the BS to the UE, a second rule to select between a validation of the second direction and an absence of an invalidation of the second direction for using the second configured resource for the communication, the second rule being different to from the first rule.

18. The method of claim 12, further comprising:
transmitting, by the BS to the UE, an indication of a second configured resource in the shared radio frequency band for a communication in a second direction,
wherein the first rule further indicates to select between a validation of the second direction and an absence of an invalidation of the second direction for using the second configured resource for the communication.

19. The method of claim 12, wherein the transmitting the first rule includes:
transmitting, by the BS to the UE, the first rule via radio resource control (RRC) signaling.

20. The method of claim 12, further comprising:
transmitting, by the BS to the UE, an indication of a second configured resource for a second communication in a second direction;
transmitting, by the BS to the UE, an indication for a channel occupancy time (COT) without a slot format indication (SFI) for the COT, the second configured resource within the COT; and
communicating, by the BS with the UE, the second communication in the second direction using the second configured resource.

21. A user equipment (UE) comprising:
a memory;
a transceiver; and
at least one processor coupled to the memory and the transceiver, wherein the UE is configured to:
receive, from a base station (BS), an indication of a first configured resource in a shared radio frequency band for a communication in a first direction;
receive, from the BS, a first rule to select between a validation of the first direction, or an absence of an invalidation of the first direction, for using the first configured resource for the communication, wherein for the invalidation the UE assumes that the first configured resource is valid unless the UE receives a direction indication for a symbol in the first configured resource;
monitor for a slot format indicator (SFI) for the first configured resource; and
communicate, with the BS in response to determining from the monitoring that no SFI is detected to invalidate the first direction for the first configured resource, the communication in the first direction using the first configured resource based on the first rule.

22. The UE of claim 21, wherein:
the UE is further configured to:
receive, by indication from the BS from the monitoring, SFI for the first configured resource; and
communicate, with the BS, the communication in response to the received SFI validating the first direction for the first configured resource.

23. The UE of claim 21, wherein the UE is further configured to:
monitor for the SFI with monitoring occasions, in particular time resources and frequency resources.

24. The UE of claim 21, wherein the UE is further configured to:
receive, from the BS, the first rule via radio resource control (RRC) signaling.

25. A base station (BS) comprising:
a memory;
a transceiver; and
at least one processor coupled to the memory and the transceiver, wherein the BS is configured to:
transmit, to a user equipment (UE), an indication of a first configured resource in a shared radio frequency band for a communication in a first direction;
transmit, to the UE, a first rule to select between a validation of the first direction or an absence of an invalidation of the first direction for using the first configured resource for the communication, wherein for the validation the UE assumes that the first configured resource is invalid until the UE receives a direction indication for each symbol in the first configured resource and for the invalidation the UE assumes that the first configured resource is valid unless the UE receives a direction indication for a symbol in the first configured resource and wherein a slot format indicator, SFI, validates or invalidates the first direction;
the first rule indicates:
selecting the validation of the first direction when the first configured resource is within a channel occupancy time (COT) of the BS; and
selecting the absence of the invalidation of the first direction when the first configured resource is outside a COT of the BS; and
communicate, with the UE, the communication in the first direction using the first configured resource based on the first rule;
transmit, by the BS to another UE, an indication of a second configured resource for a communication in a second direction;
transmit, by the BS to the UE, a downlink communication during a channel occupancy time, COT, of the UE; and
transmit, by the BS to the another UE, an indication to cancel the communication for the second configured resource based on a determination that the second configured resource is within the COT of the UE, wherein the transmitting the indication to cancel the communication for the second configured resource includes transmitting, by the BS to the another UE, a slot format indicator (SFI) indicating a third direction for the second configured resource different from the second direction.

26. The BS of claim 25, wherein the BS is further configured to:
transmit, to the UE, a slot format indicator (SFI) indicating the first direction for the first configured resource; and
communicate, with the UE, the communication is in response to the transmitted SFI validating the first direction for the first configured resource.

27. The BS of claim 25, wherein the BS is further configured to:
transmit, to the UE, the first rule via radio resource control (RRC) signaling.

* * * * *